(12) United States Patent
Lai et al.

(10) Patent No.: US 12,007,619 B2
(45) Date of Patent: Jun. 11, 2024

(54) IMAGING LENS SYSTEM, IMAGE CAPTURING UNIT AND ELECTRONIC DEVICE

(71) Applicant: LARGAN PRECISION CO., LTD., Taichung (TW)

(72) Inventors: Yu Chen Lai, Taichung (TW); Ming-Ta Chou, Taichung (TW); Cheng-Feng Lin, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 18/217,305

(22) Filed: Jun. 30, 2023

(65) Prior Publication Data
US 2023/0350152 A1    Nov. 2, 2023

Related U.S. Application Data

(63) Continuation of application No. 17/076,673, filed on Oct. 21, 2020, now Pat. No. 11,726,290.

(30) Foreign Application Priority Data

Sep. 16, 2020    (TW) .................................. 109131903

(51) Int. Cl.
G02B 7/02    (2021.01)
G02B 13/18    (2006.01)

(52) U.S. Cl.
CPC ............. *G02B 7/021* (2013.01); *G02B 13/18* (2013.01)

(58) Field of Classification Search
CPC .......... G02B 7/02; G02B 7/021; G02B 7/022; G02B 7/023; G02B 7/025; G02B 7/026; G02B 7/027; G02B 7/028; G02B 13/18
See application file for complete search history.

(56) References Cited

U.S. PATENT DOCUMENTS 6,055,111 A     4/2000   Nomura et al.
7,289,282 B2   10/2007   Matsushima
(Continued)

FOREIGN PATENT DOCUMENTS

CN    1890591 A     1/2007
CN    201555975 U   8/2010
(Continued)

OTHER PUBLICATIONS

Taiwan Office Action Dated May 18, 2021 as recieved in application No. 109131903.

*Primary Examiner* — Ephrem Z Mebrahtu
(74) *Attorney, Agent, or Firm* — Maschoff Brennan

(57) ABSTRACT

An imaging lens system has an optical axis and an image surface through which the optical axis passes. The imaging lens system includes a plastic lens barrel surrounding the optical axis. The plastic lens barrel includes an image-side portion and an object-side aperture through which the optical axis passes, and the image-side portion is located between the image surface and the object-side aperture. The image-side portion includes a protrusive structure surrounding the optical axis and extending towards the image surface. The protrusive structure has an inner surface facing the optical axis, an outer surface disposed opposite to the inner surface and located farther away from the optical axis than the inner surface and a reflection-reducing surface extending towards the image surface and connected to and located between the inner surface and the outer surface. The protrusive structure includes a reflection-reducing structure disposed on the reflection-reducing surface.

14 Claims, 23 Drawing Sheets

(56) References Cited

U.S. PATENT DOCUMENTS

| | | |
|---|---|---|
| 7,417,812 B2 | 8/2008 | Chang |
| 7,724,451 B2 | 5/2010 | Takase |
| 8,259,401 B2 | 9/2012 | Schmieder et al. |
| 9,933,589 B2 | 4/2018 | Lo et al. |
| 2007/0116445 A1 | 5/2007 | Kozakai et al. |
| 2017/0153447 A1* | 6/2017 | Chou ............ G02B 7/021 |
| 2018/0003916 A1 | 1/2018 | Lin |
| 2019/0174032 A1* | 6/2019 | Yang ............ G02B 7/021 |
| 2021/0239932 A1 | 8/2021 | Feng |

FOREIGN PATENT DOCUMENTS

| | | |
|---|---|---|
| CN | 201689206 U | 12/2010 |
| CN | 206523681 U | 9/2017 |
| CN | 206876941 U | 1/2018 |
| CN | 207965300 U | 10/2018 |
| CN | 208026962 U | 10/2018 |
| CN | 210090781 U | 2/2020 |
| CN | 210090802 U | 2/2020 |

\* cited by examiner

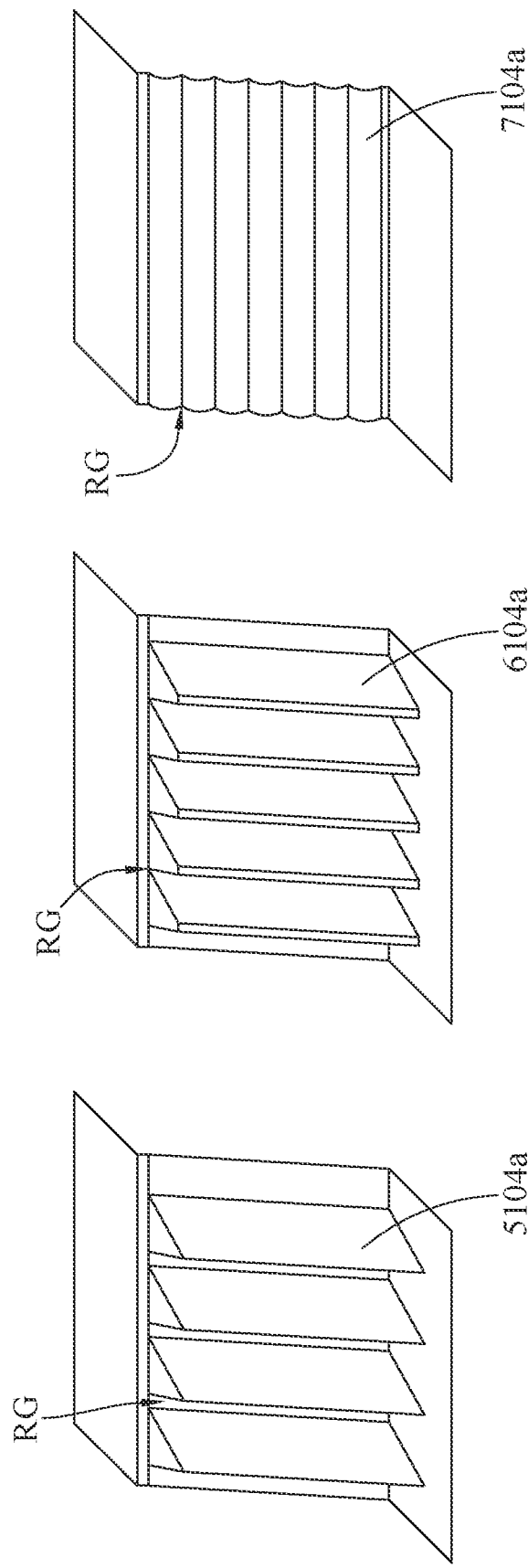

IMAGING LENS SYSTEM, IMAGE CAPTURING UNIT AND ELECTRONIC DEVICE

RELATED APPLICATIONS

This application is a continuation patent application of U.S. application Ser. No. 17/076,673, filed on Oct. 21, 2020, which claims priority to Taiwan Application 109131903, filed on Sep. 16, 2020, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

With the development of semiconductor manufacturing technology, the performance of image sensors for having more pixels has been improved. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

A conventional optical lens system can have a larger image sensor to receive more light and to accommodate more pixels in an ideal state, and better image quality can thus be expected. However, the optical lens system is limited to its size and a loading of a driver, so that the optical lens system and the image sensor cannot be unlimitedly enlarged when all things are considered. This leads a decrease in relative illumination corresponding to the edge area of the image sensor, which affecting image quality. Accordingly, how to improve the structure of the optical lens system is an important topic in the field nowadays.

SUMMARY

According to one aspect of the present disclosure, an imaging lens system has an optical axis and an image surface through which the optical axis passes. The imaging lens system includes a plastic lens barrel surrounding the optical axis. The plastic lens barrel includes an image-side portion and an object-side aperture, the image-side portion is located between the image surface and the object-side aperture, and the optical axis passes through the object-side aperture. The image-side portion includes a plurality of protrusive structures surrounding the optical axis and extending towards the image surface. Each of the plurality of protrusive structures has an inner surface, an outer surface and at least one reflection-reducing surface. The inner surface faces the optical axis. The outer surface is disposed opposite to the inner surface, and the outer surface is located farther away from the optical axis than the inner surface. The at least one reflection-reducing surface extends along a direction towards the image surface, and the at least one reflection-reducing surface is connected to and located between the inner surface and the outer surface. Each of the plurality of protrusive structures includes at least one first reflection-reducing structure disposed on the at least one reflection-reducing surface.

According to another aspect of the present disclosure, an image capturing unit includes the abovementioned imaging lens system.

According to another aspect of the present disclosure, an electronic device includes the abovementioned image capturing unit and an image sensor disposed on the image surface of the imaging lens system.

BRIEF DESCRIPTION OF THE DRAWINGS

The disclosure can be better understood by reading the following detailed description of the embodiments, with reference made to the accompanying drawings as follows:

FIG. 22 is a perspective view of a first reflection-reducing structure according to one embodiment of the present disclosure;

FIG. 23 is a perspective view of a first reflection-reducing structure according to another embodiment of the present disclosure;

FIG. 24 is a perspective view of a first reflection-reducing structure according to another embodiment of the present disclosure;

DETAILED DESCRIPTION

Figure 1:
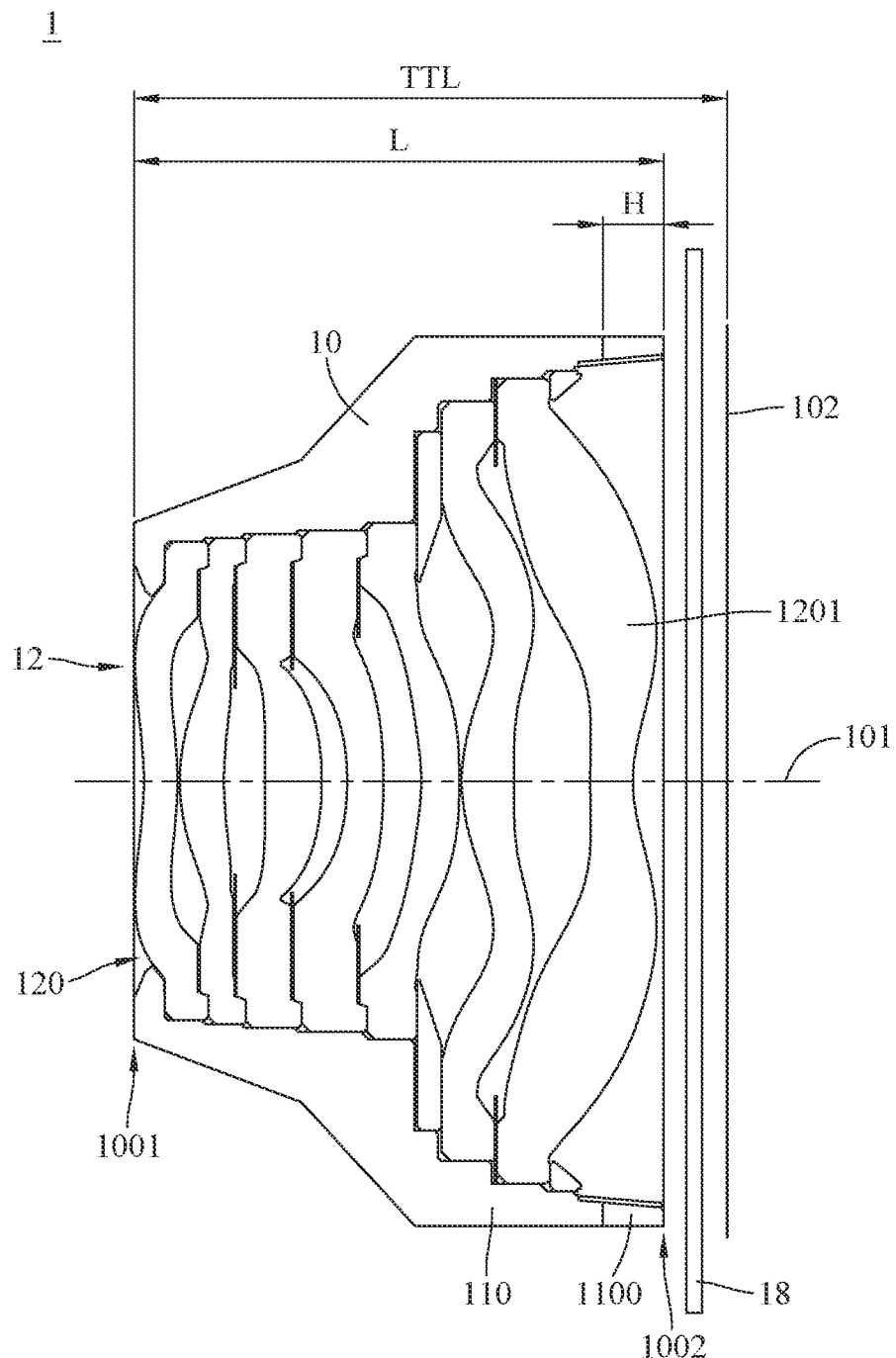
FIG. 1 is a cross-sectional view of an imaging lens system according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens system having an optical axis and an image surface. The optical axis passes through the image surface, and the image surface can have an appearance of a rectangle. The imaging lens system includes a plastic lens barrel surrounding the optical axis. The plastic lens barrel includes an image-side portion and an object-side aperture, the image-side portion is located between the image surface and the object-side aperture, and the optical axis passes through the object-side aperture. Specifically, the plastic lens barrel can have an object side end facing an object side and an image side end facing an image side and the image surface, wherein the object-side aperture is located at the object side end, and the image-side portion is located at the image side end. Moreover, the plastic lens barrel can have a cross section at the image side end being non-circular. Therefore, it is favorable for being matched to the design of the image surface or an image capturing unit to be applied; by being matched to the design of the image surface, it is favorable for reducing light imaging out of the image surface, thereby reducing stray light and thus increasing image quality; by being matched to the design of the image capturing unit, it is favorable for achieving a function of fixing the imaging lens system, thereby reducing assembly tolerance. Please refer to FIG. 9, which shows a schematic view of the imaging lens system 2 according to the 2nd embodiment of the present disclosure viewing from the image side, wherein the plastic lens barrel 20 has a cross section at the image side end 2002 being a chamfered rectangle. Please refer to FIG. 11, which shows a schematic view of the imaging lens system 3 according to the 3rd embodiment of the present disclosure viewing from the image side, wherein the plastic lens barrel 30 has a cross section at the image side end 3002 being a long oval.

The image-side portion includes a plurality of protrusive structures surrounding the optical axis and extending towards the image surface. Each of the plurality of protrusive structures has an inner surface, an outer surface and at least one reflection-reducing surface. The inner surface faces the optical axis. The outer surface is disposed opposite to the inner surface, and the outer surface is located farther away from the optical axis than the inner surface. The at least one reflection-reducing surface extends along a direction towards the image surface, and the at least one reflection-reducing surface is connected to and located between the inner surface and the outer surface. Each of the plurality of protrusive structures includes at least one first reflection-reducing structure disposed on the at least one reflection-reducing surface. By providing the protrusive structures at the image side end of the plastic lens barrel and the reflection-reducing surfaces of the protrusive structures, it is favorable for effectively increasing relative illumination, thereby obtaining good image quality. In addition, the structure of the plastic lens barrel is also favorable for further reducing the overall size and weight of the imaging lens system, thereby increasing the overall operating speed.

The number of the plurality of protrusive structures can be two, and the two protrusive structures can be disposed opposite to each other in opposite orientation relative to the optical axis. Therefore, it is favorable for preventing a tilt of the imaging lens system when the imaging lens system is placed on a platform such as an assembling structure in a manner that the object side end thereof facing away from the platform, which facilitates the assembly. Moreover, the number of the plurality of protrusive structures can also be at least three, and the at least three protrusive structures can also be disposed axisymmetric to the optical axis in orientation relative to the optical axis. Please refer to FIG. 2, which shows a schematic view of four protrusive structures 1100 according to the 1st embodiment of the present disclosure that are disposed axisymmetric to the optical axis 101 in orientation relative to the optical axis 101.

Each of the plurality of protrusive structures can further include a second reflection-reducing structure disposed on the inner surface, and the second reflection-reducing structure is connected to the at least one first reflection-reducing structure on the at least one reflection-reducing surface. Therefore, it is favorable for further reducing stray light from the image-side portion. Moreover, the connected first reflection-reducing structure and second reflection-reducing structure can have a cross section being U-shaped in a direction perpendicular to the optical axis. Please refer to FIG. 8, which shows a schematic view of the first reflection-reducing structure 2104 and the second reflection-reducing structure 2105 according to the 2nd embodiment of the present disclosure that have a cross section being U-shaped in a direction perpendicular to the optical axis 201.

According to the present disclosure, the imaging lens system can further include a plurality of optical elements received in the plastic lens barrel. The optical axis passes through the plurality of optical elements. The plurality of protrusive structures are located closer to the image surface than the plurality of optical elements. Specifically, the plurality of optical elements include a most-image-side optical element located closer to the image surface than the other optical elements in the plastic lens barrel, and the plurality of protrusive structures are located closer to the image surface than the most-image-side optical element. Therefore, it is favorable for the plurality of protrusive structures to protect the plurality of optical elements from the image side so as to increase the yield rate of products. Moreover, the most-image-side optical element can be a lens element or a retainer.

The at least one first reflection-reducing structure can have a plurality of reflection-reducing grooves and can be a V-shaped structure. Specifically, the at least one first reflection-reducing structure can include a plurality of long protrusions or tapered protrusions. The plurality of long protrusions or tapered protrusions are arranged side by side to form the V-shaped structure, and adjacent two of the plurality of long protrusions or tapered protrusions form one of the plurality of reflection-reducing grooves therebetween. Therefore, it is favorable for reducing stray light so as to increase relative illumination, thereby obtaining good image quality. Moreover, the plurality of long protrusions can extend towards the image-side portion from the object-side aperture, and the plurality of long protrusions can have cross sections in directions perpendicular to the optical axis being triangular, trapezoidal or arc-shaped. Moreover, the plurality of long protrusions can also have fillet corners. Please refer to FIG. 8, which shows a schematic view of the plurality of long protrusions 2104a according to the 2nd embodiment of the present disclosure that extend towards the image-side portion 210 from the object-side aperture 220 and have cross sections in directions perpendicular to the optical axis 201 being triangular. Please refer to FIG. 23, which shows a schematic view of the plurality of long protrusions 6104a according to another embodiment of the present disclosure that have cross sections being trapezoidal. Please refer to FIG. 24, which shows a schematic view of the plurality of long protrusions 7104a according to another embodiment of the present disclosure that have cross sections being arc-shaped. Please refer to FIG. 25, which shows a schematic view of the plurality of tapered protrusions 8104b according to another embodiment of the present disclosure. Please refer to FIG. 26, which shows a schematic view of the plurality of long protrusions 9104a according to another embodiment of the present disclosure that have fillet corners. As shown in the abovementioned figures, the at least one first reflection-reducing structure can include protrusion structures arranged in different directions or protruding in different shapes.

The plastic lens barrel can further include at least one third reflection-reducing structure at the image side end thereof, and the at least one third reflection-reducing structure faces the image surface and is connected to the at least one first reflection-reducing structure of the plurality of protrusive structures. By further providing a reflection-reducing structure at the image side end of the plastic lens barrel, it is favorable for further reducing stray light generated at the image side end so as to increase image quality. Please refer to FIG. 3, which shows a schematic view of the third reflection-reducing structure 130 at the image side end 1002 of the plastic lens barrel 10 according to the 1st embodiment of the present disclosure. The abovementioned first through third reflection-reducing structures are V-shaped, but the present disclosure is not limited thereto. In some embodiment, one the first through third reflection-reducing structures can have a roughened surface instead of the reflection-reducing grooves so as to achieve a reflection-reducing effect, wherein the roughened surface can be manufactured by a subtractive manufacture such as sand-blasting and etching or an additive manufacture such as transfer and coating. Please refer to FIG. 16, which shows a schematic view of the roughened surface, represented by dots, of one of the second reflection-reducing structures 4105 of the protrusive structures 1100.

According to the present disclosure, the imaging lens system can further include at least one driving assembly. The plastic lens barrel can further include at least one mounting structure disposed on an outer surface of the plastic lens barrel and protruding in a direction away from the optical axis. The at least one driving assembly can include a coil and a magnet component, one of the coil and the magnet component can be disposed on the at least one mounting structure, and the coil and the magnet component are disposed corresponding to each other. The coil and the magnet component can be configured to drive the imaging lens system to move or to rotate. Therefore, it is favorable for providing an electromagnetic force generated by the electromagnetic interaction between the coil and the magnet component so as to achieve auto-focus and optical stabilization effects by the driving assembly. In addition, it is favorable for further reducing the overall size by integrating the imaging lens system and the driving assembly into one piece. Moreover, the coil can be disposed on the at least one mounting structure, while the magnet component is disposed corresponding to the coil. Alternatively, the magnet component can be disposed on the at least one mounting structure, while the coil is disposed corresponding to the magnet component. Moreover, the number of the at least one driving assembly can be two, the number of the at least one mounting structure can be two, and the two mounting structures can be respectively located at opposite sides of the plastic lens barrel symmetric to the optical axis for the two driving assemblies to be respectively disposed thereon. Therefore, it is favorable for evenly providing an electromagnetic force by the driving assemblies. Please refer to FIG. 7, which shows a schematic view of two coils 2401 of two mounting structures 240 of the plastic lens barrel 20 and two magnet components 2402 respectively disposed corresponding to the two coils 2401 according to the 2nd embodiment of the present disclosure.

According to the present disclosure, the imaging lens system can further include at least one gelatinous substance surrounding the optical axis and located closer to the image surface than peripheral areas of the plurality of optical elements. Therefore, it is favorable for achieving the effect of fixing the optical elements by the gelatinous substance instead of a retainer, which can save more thickness than the retainer and also protect the peripheral areas of the optical elements. Please refer to FIG. 10 and FIG. 11, which show schematic views of the gelatinous substances 36 according to the 3rd embodiment of the present disclosure that surround the optical axis 301.

When a physical length along a direction parallel to the optical axis of each of the plurality of protrusive structures is H, and a physical length along the direction parallel to the optical axis of the imaging lens system is L, the following condition can be satisfied: $5\% \leq H/L \times 100\% \leq 30\%$. Therefore, it is favorable for increasing the yield rate of molding the plastic lens barrel by restricting the ratio of the physical length of the protrusive structures to that of the imaging lens system. Moreover, the following condition can also be satisfied: $0.3 \ [mm] \leq H \leq 1.3 \ [mm]$. In this specification, "a physical length" refers to an actual length of an object. Therefore, "the physical length of the imaging lens system" does not include the portion where the image surface is located. Please refer to FIG. 1, FIG. 6, FIG. 10 and FIG. 14, which show schematic views of H and L according to the 1st through 4th embodiments of the present disclosure.

When a minimum angle between a line in a direction perpendicular to the optical axis from one of the plurality of protrusive structures to the optical axis and a line in a direction perpendicular to the optical axis from an internal angle of the rectangle to the optical axis is $\theta 1$, the following condition can be satisfied: $5 \ [deg.] \leq \theta 1 \leq 50 \ [deg.]$. Therefore, it is favorable for preventing unwanted stray light due to an overly large assembly tolerance generated by assembling the imaging lens system to an image capturing unit, thereby increasing the yield rate. Please refer to FIG. 5, FIG. 9, FIG. 11 and FIG. 17, which show schematic views of $\theta 1$ according to the 1st through 4th embodiments of the present disclosure.

When a minimum angle between two lines in directions perpendicular to the optical axis from adjacent two of the plurality of protrusive structures to the optical axis is $\theta 2$, the following condition can be satisfied: $25 \ [deg.] \leq \theta 2 \leq 150 \ [deg.]$. Therefore, it is favorable for preventing unwanted stray light due to an overly large assembly tolerance generated by assembling the imaging lens system to the image capturing unit, thereby increasing the yield rate. Please refer to FIG. 5, FIG. 9, FIG. 11 and FIG. 17, which show schematic views of θ2 according to the 1st through 4th embodiments of the present disclosure.

When a maximum distance along a direction perpendicular to the optical axis from the image surface to the optical axis is IMGH, an axial distance from an object side end of the imaging lens system to the image surface is TTL, and a focal length of the imaging lens system is EFL, the following condition can be satisfied: $0.6<\text{IMGH}/[(\text{TTL}+\text{EFL})/2]<1.7$. Therefore, it is favorable for further enhancing the effect provided by the protrusive structures so as to make the reflection-reducing surface work when the size and the focal length of the imaging lens system and the size of the image sensor are located in the ranges. Moreover, the following condition can also be satisfied: $0.65<\text{IMGH}/[(\text{TTL}+\text{EFL})/2]<1.65$. Moreover, the following condition can also be satisfied: $0.7\leq\text{IMGH}/[(\text{TTL}+\text{EFL})/2]\leq1.2$. In this specification, "the object side end of the imaging lens system" refers to an object side end of a component closest to the object side among components included by the imaging lens system, and thus "the object side end of the imaging lens system" can be an object side end of the plastic lens barrel, an object side end of the optical elements or even an object side end of the driving assembly. Please refer to FIG. 1, FIG. 6, FIG. 10 and FIG. 14, which show schematic views of TTL according to the 1st through 4th embodiments of the present disclosure; please refer to FIG. 5, FIG. 9, FIG. 11 and FIG. 17, which show schematic views of IMGH according to the 1st through 4th embodiments of the present disclosure, wherein the object side ends of the imaging lens systems 1, 2, 3 and 4 refer to the object side ends 1001, 2001, 3001 and 4001 of the plastic lens barrel 10, 20, 30 and 40 in all of the above four embodiments.

According to the present disclosure, the aforementioned features and conditions can be utilized in numerous combinations so as to achieve corresponding effects.

According to the present disclosure, the imaging lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment.

According to the above description of the present disclosure, the following specific embodiments are provided for further explanation.

1st Embodiment

Figure 2:
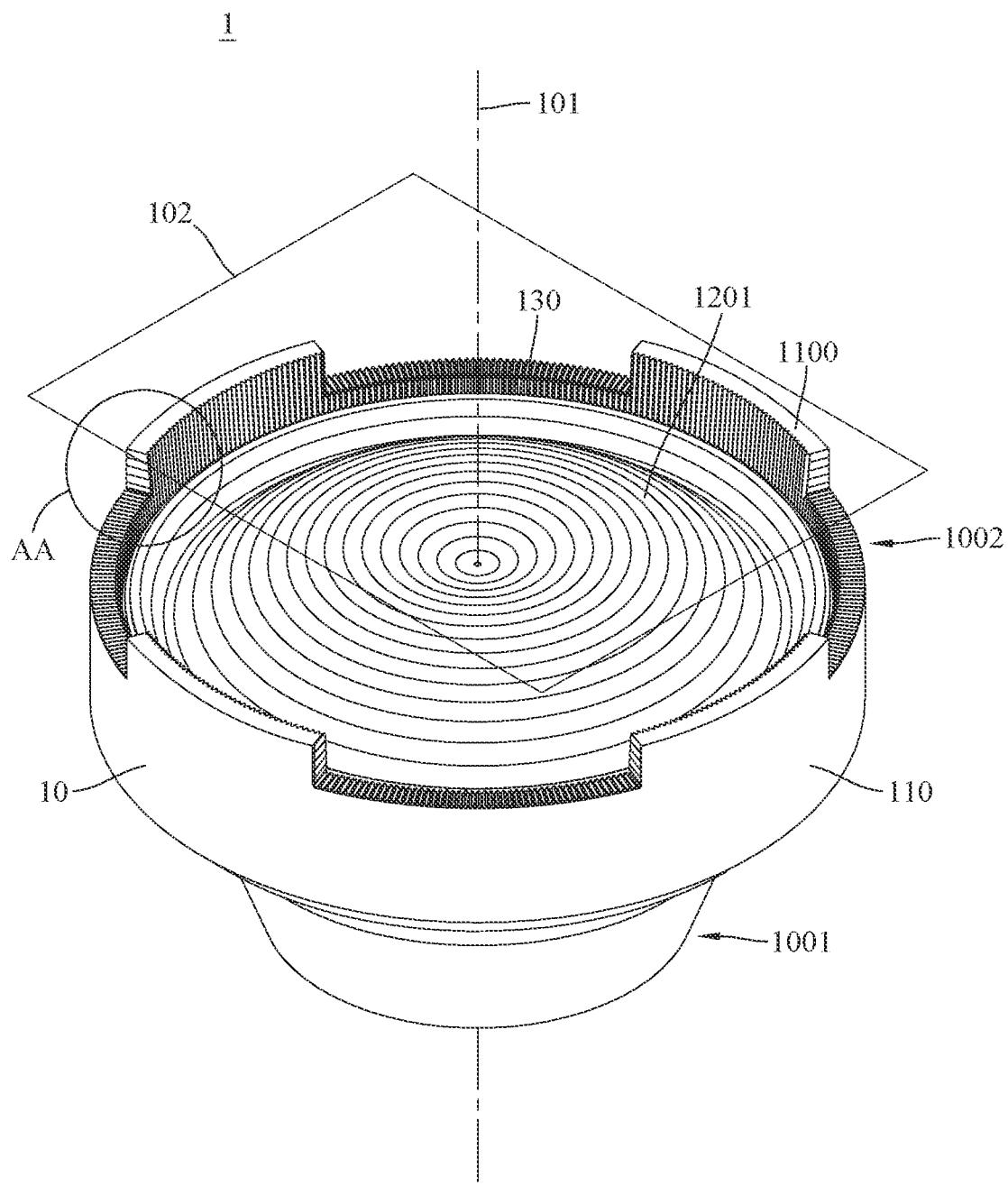
FIG. 2 is a perspective view of the imaging lens system in FIG. 1.
Figure 3:
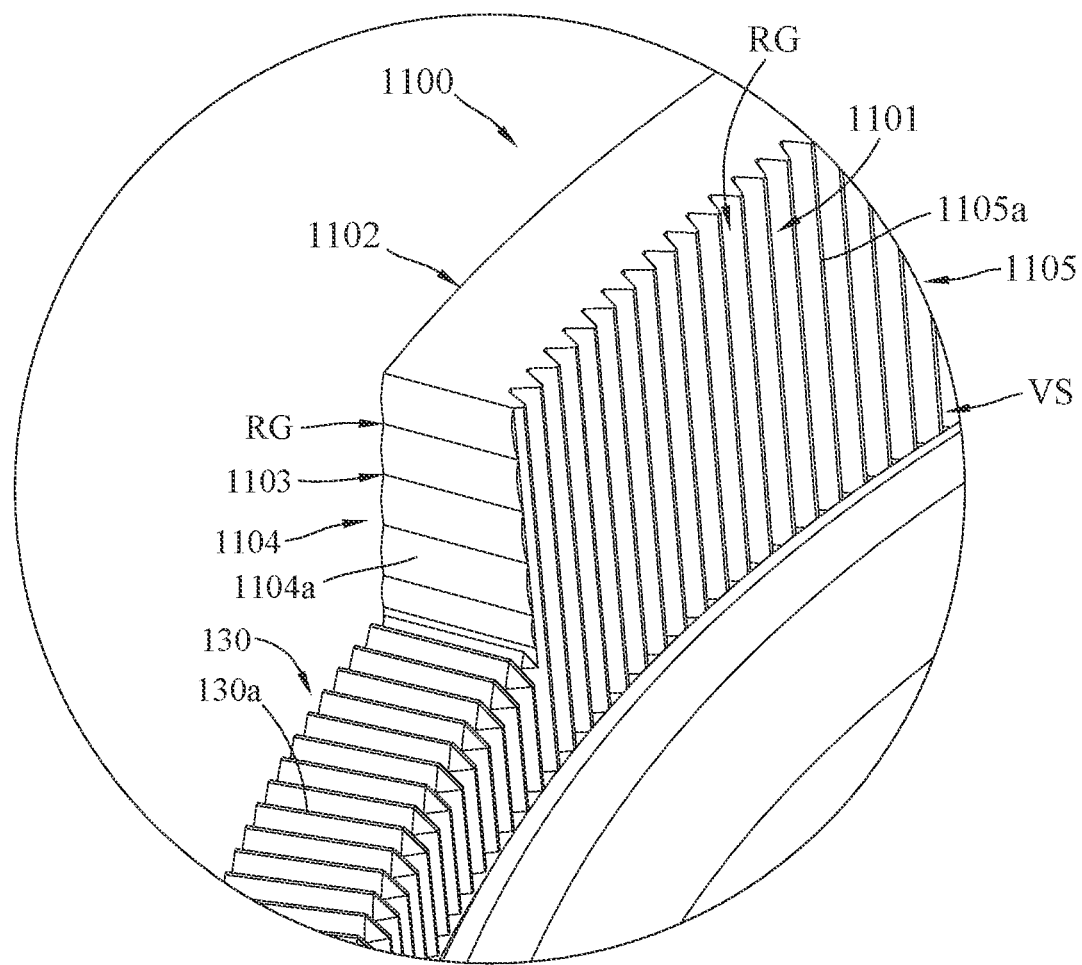
FIG. 3 is an enlarged view of the AA region of the imaging lens system in FIG. 2.
Figure 4:
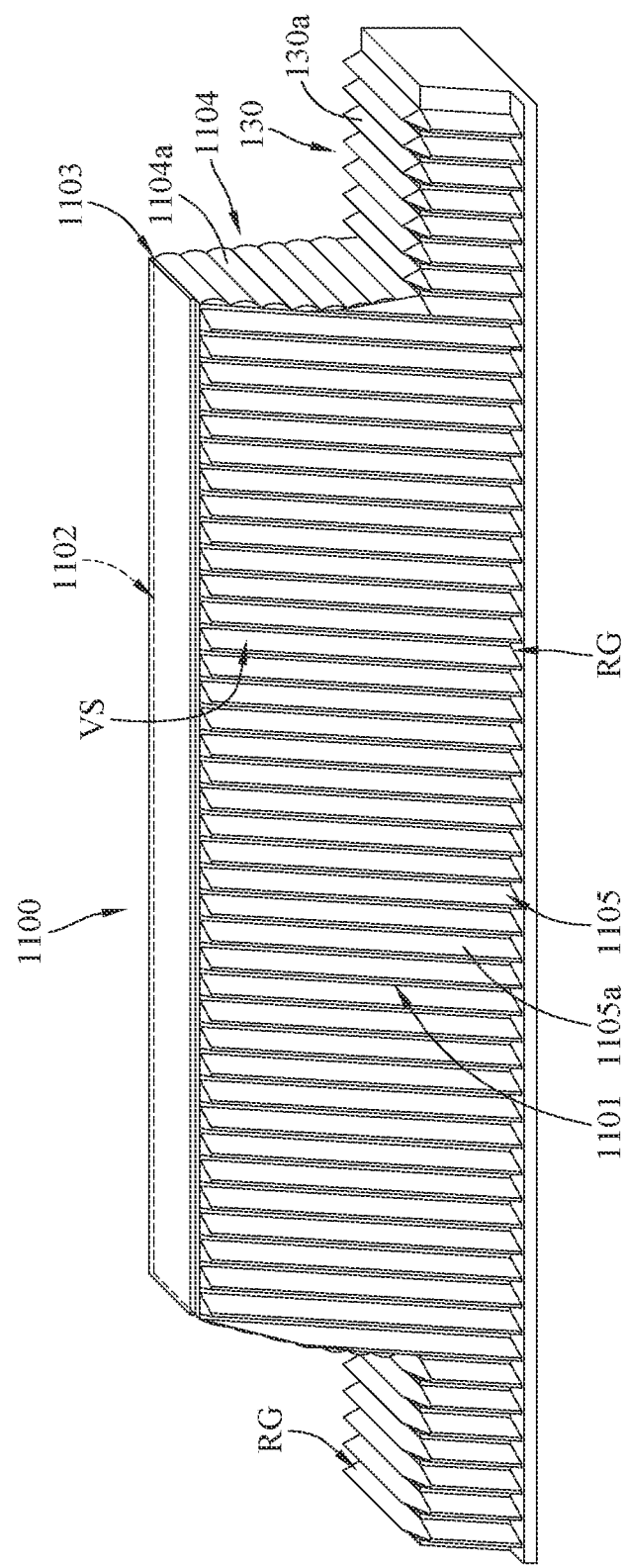
FIG. 4 is an enlarged view of a protrusive structure of the imaging lens system in FIG. 2.
Figure 5:
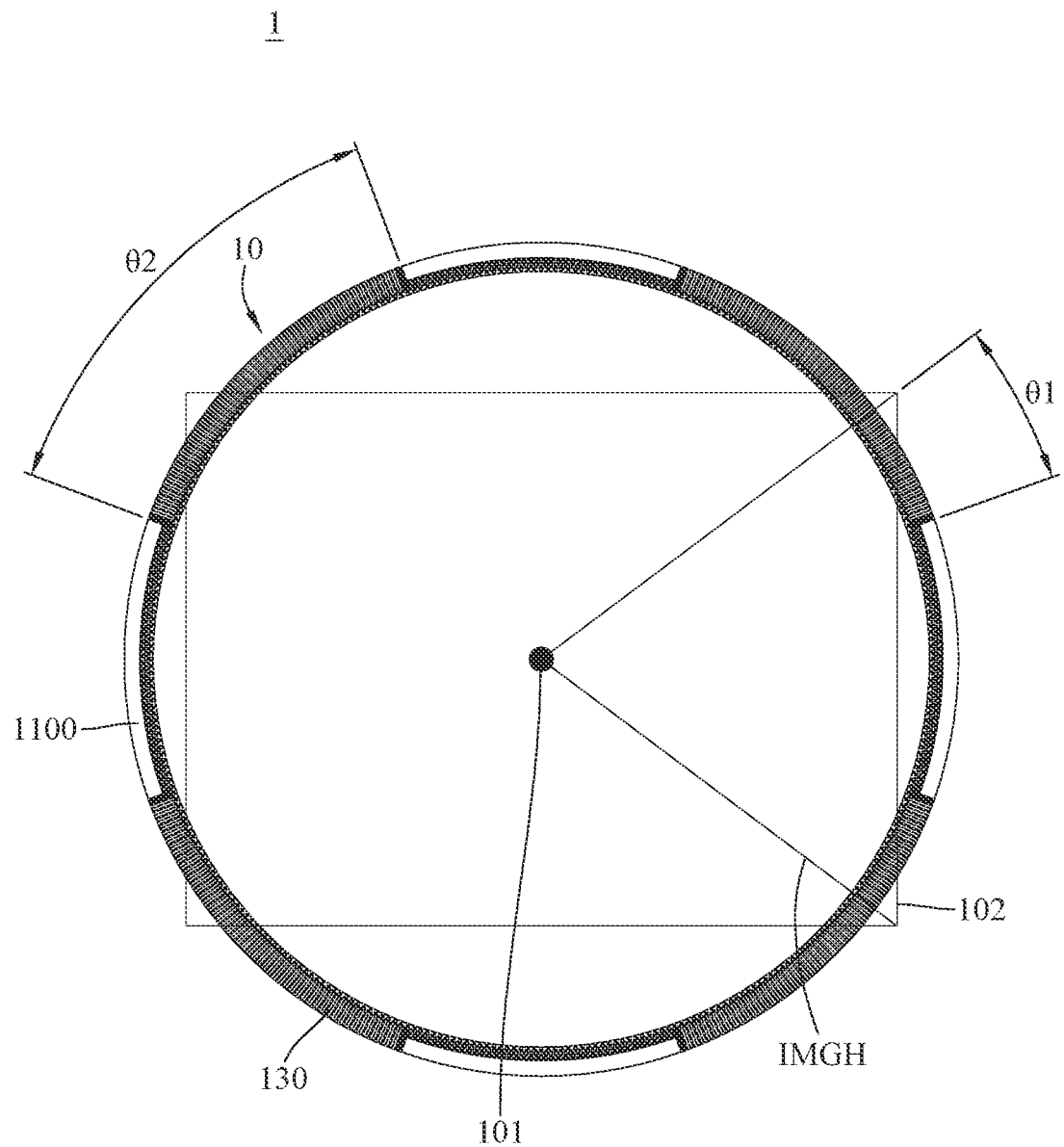
FIG. 5 is a bottom view of the imaging lens system in FIG. 1 viewing from the image side.

Please refer to FIG. 1 to FIG. 5, where FIG. 1 is a cross-sectional view of an imaging lens system according to the 1st embodiment of the present disclosure, FIG. 2 is a perspective view of the imaging lens system in FIG. 1, FIG. 3 is an enlarged view of the AA region of the imaging lens system in FIG. 2, FIG. 4 is an enlarged view of a protrusive structure of the imaging lens system in FIG. 2, and FIG. 5 is a bottom view of the imaging lens system in FIG. 1 viewing from the image side.

In this embodiment, an imaging lens system 1 has an optical axis 101 and an image surface 102. The optical axis 101 passes through the geometric center of the image surface 102, and the image surface 102 has an appearance of a rectangle as shown in FIG. 5. The imaging lens system 1 includes a plastic lens barrel 10 and a plurality of optical elements 12, the plastic lens barrel 10 surrounds the optical axis 101, the optical elements 12 are received in the plastic lens barrel 10, and the optical axis 101 passes through the optical elements 12. The optical elements 12 include, for example, a lens element, a light-blocking element, an aperture stop, a stop, a spacer, a retainer, etc., and the present disclosure is not limited thereto.

The plastic lens barrel 10 has an object side end 1001 facing an object side (e.g., the left side of FIG. 1) and an image side end 1002 facing an image side (e.g., the right side of FIG. 1) and the image surface 102. As shown in FIG. 5, the plastic lens barrel 10 has a cross section at the image side end 1002 being a circle when viewing the imaging lens system 1 from the image side.

The plastic lens barrel 10 includes an image-side portion 110 and an object-side aperture 120. The image-side portion 110 is located at the image side end 1002 and between the image surface 102 and the object-side aperture 120. The object-side aperture 120 is located at the object side end 1001, and the optical axis 101 passes through the object-side aperture 120. The object-side aperture 120 can be used as an aperture opening of the imaging lens system 1 for light incident into the optical elements 12 in the plastic lens barrel 10.

The image-side portion 110 includes four protrusive structures 1100. Two of the protrusive structures 1100 are disposed opposite to each other in opposite orientation relative to the optical axis 101, while another two of the protrusive structures 1100 are disposed opposite to each other in opposite orientation relative to the optical axis 101. Specifically, the four protrusive structures 1100 surround the optical axis 101 in arc shapes and are disposed axisymmetric to the optical axis 101. The protrusive structures 1100 extend towards the image surface 102. Each of the protrusive structures 1100 has an inner surface 1101, an outer surface 1102 and two reflection-reducing surfaces 1103. Each of the inner surfaces 1101 faces the optical axis 101. The outer surfaces 1102 are respectively disposed opposite to the inner surfaces 1101, and the outer surfaces 1102 are respectively located farther away from the optical axis 101 than the inner surfaces 1101. The reflection-reducing surfaces 1103 extend along directions towards the image surface 102; in other words, the extending directions of the reflection-reducing surfaces 1103 are towards the image surface 102. The reflection-reducing surfaces 1103 are connected to and located between the inner surfaces 1101 and the outer surfaces 1102.

Each of the protrusive structures 1100 includes two first reflection-reducing structures 1104 and a second reflection-reducing structure 1105. The first reflection-reducing structures 1104 are respectively disposed on the reflection-reducing surfaces 1103. The second reflection-reducing structures 1105 are respectively disposed on the inner surfaces 1101, and the second reflection-reducing structures 1105 are connected to and located between the first reflection-reducing structures 1104.

Each of the first reflection-reducing structures 1104 includes a plurality of long protrusions 1104a arranged side by side along the optical axis 101, and the long protrusions 1104a have cross sections in a direction parallel to the optical axis 101 being arc-shaped. The long protrusions 1104a which are arranged side by side form a V-shaped structure VS, and adjacent two of the long protrusions 1104a form a reflection-reducing groove RG therebetween.

Each of the second reflection-reducing structures 1105 includes a plurality of long protrusions 1105a arranged side by side and extending towards the image-side portion 110 from the object-side aperture 120, and the long protrusions 1105a have cross sections in directions perpendicular to the optical axis 101 being triangular. The long protrusions 1105a which are arranged side by side also form a V-shaped structure VS, and adjacent two of the long protrusions 1105a form a reflection-reducing groove RG therebetween. In addition, the connected two first reflection-reducing structures 1104 and one second reflection-reducing structure 1105 have a cross section being U-shaped in a direction perpendicular to the optical axis 101.

The plastic lens barrel 10 further includes third reflection-reducing structures 130 at the image side end 1002 thereof, and each of the third reflection-reducing structures 130 includes a plurality of long protrusions 130a. Part of the long protrusions 130a of the third reflection-reducing structures 130 are located on surfaces facing towards the image surface 102, extend along directions perpendicular to the optical axis 101 and are connected to the long protrusions 1104a of the first reflection-reducing structures 1104, while another part of the long protrusions 130a of the third reflection-reducing structures 130 are located on surfaces facing towards the optical axis 101, extend towards the image-side portion 110 from the object-side aperture 120 and are connected to the long protrusions 1105a of the second reflection-reducing structures 1105 of the protrusive structures 1100. The long protrusions 130a have cross sections being triangular. The long protrusions 130a which are arranged side by side also form a V-shaped structure VS, and adjacent two of the long protrusions 130a form a reflection-reducing groove RG therebetween.

Figure 26:
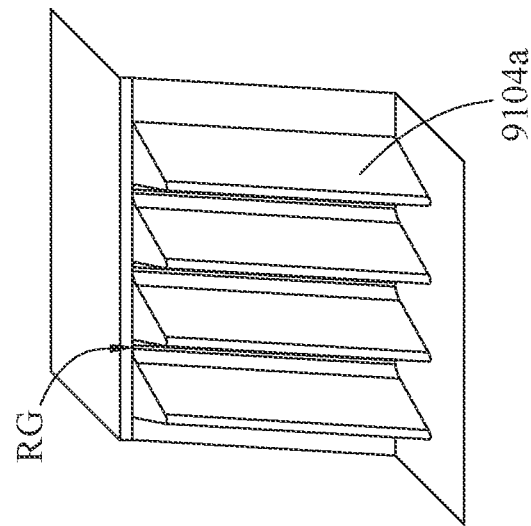
FIG. 26 is a perspective view of a first reflection-reducing structure according to another embodiment of the present disclosure.
Figure 25:
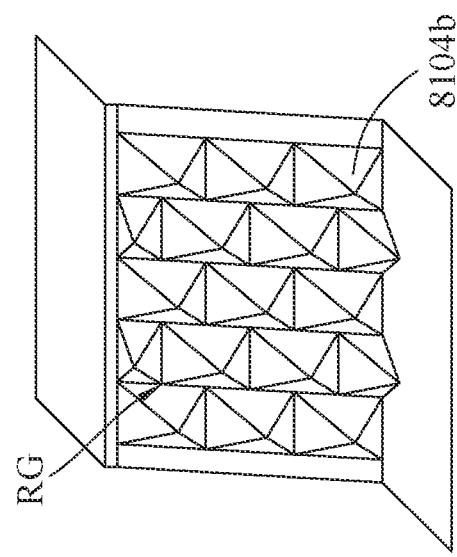
FIG. 25 is a perspective view of a first reflection-reducing structure according to another embodiment of the present disclosure.

The abovementioned long protrusions 1104a of the first reflection-reducing structures 1104 are similar to the long protrusions 7104a with arc-shaped cross sections as shown in FIG. 24, while the abovementioned long protrusions 1105a of the second reflection-reducing structures 1105 and the abovementioned long protrusions 130a of the third reflection-reducing structures 130 are similar to the long protrusions 5104a with triangular cross sections as shown in FIG. 22. However, the present disclosure is not limited thereto. The first reflection-reducing structures 1104 may also include long protrusions 5104a, 6104a or 9104a as shown in FIG. 22, FIG. 23 or FIG. 26 or tapered protrusions 8104b as shown in FIG. 25, while the second reflection-reducing structures 1105 or the third reflection-reducing structures 130 may also include long protrusions 6104a, 7104a or 9104a as shown in FIG. 23, FIG. 24 or FIG. 26 or tapered protrusions 8104b as shown in FIG. 25.

The optical elements 12 include a most-image-side optical element 1201 which is a lens element and is located closer to the image surface 102 than the other optical elements in the plastic lens barrel 10. The protrusive structures 1100 are located closer to the image surface 102 than the most-image-side optical element 1201 along the direction parallel to the optical axis 101.

The imaging lens system 1 further includes a filter 18. The filter 18 is made of glass material and located between the most-image-side optical element 1201 and the image surface 102, and will not affect a focal length of the imaging lens system 1.

When a physical length along the direction parallel to the optical axis 101 of each of the protrusive structures 1100 is H, and a physical length along the direction parallel to the optical axis 101 of the imaging lens system 1 is L, the following conditions are satisfied: H=0.8 [mm]; L=6.97 [mm]; and H/L×100%=11.5%.

When a minimum angle between a line in a direction perpendicular to the optical axis 101 from one of the protrusive structures 1100 to the optical axis 101 and a line in a direction perpendicular to the optical axis 101 from an internal angle of the rectangular image surface 102 to the optical axis 101 is θ1, the following condition is satisfied: θ1=16 [deg.].

When a minimum angle between two lines in directions perpendicular to the optical axis 101 from adjacent two of the protrusive structures 1100 to the optical axis 101 is θ2, the following condition is satisfied: θ2=49 [deg.].

When a maximum distance along a direction perpendicular to the optical axis 101 from the image surface 102 to the optical axis 101 is IMGH, an axial distance from an object side end of the imaging lens system 1 (i.e., the object side end 1001 of the plastic lens barrel 10 in this embodiment) to the image surface 102 is TTL, and the focal length of the imaging lens system 1 is EFL, the following conditions are satisfied: IMGH=6.24 [mm]; TTL=7.8 [mm]; EFL=5.2 [mm]; and IMGH/[(TTL+EFL)/2]=0.96.

2nd Embodiment

Figure 6:
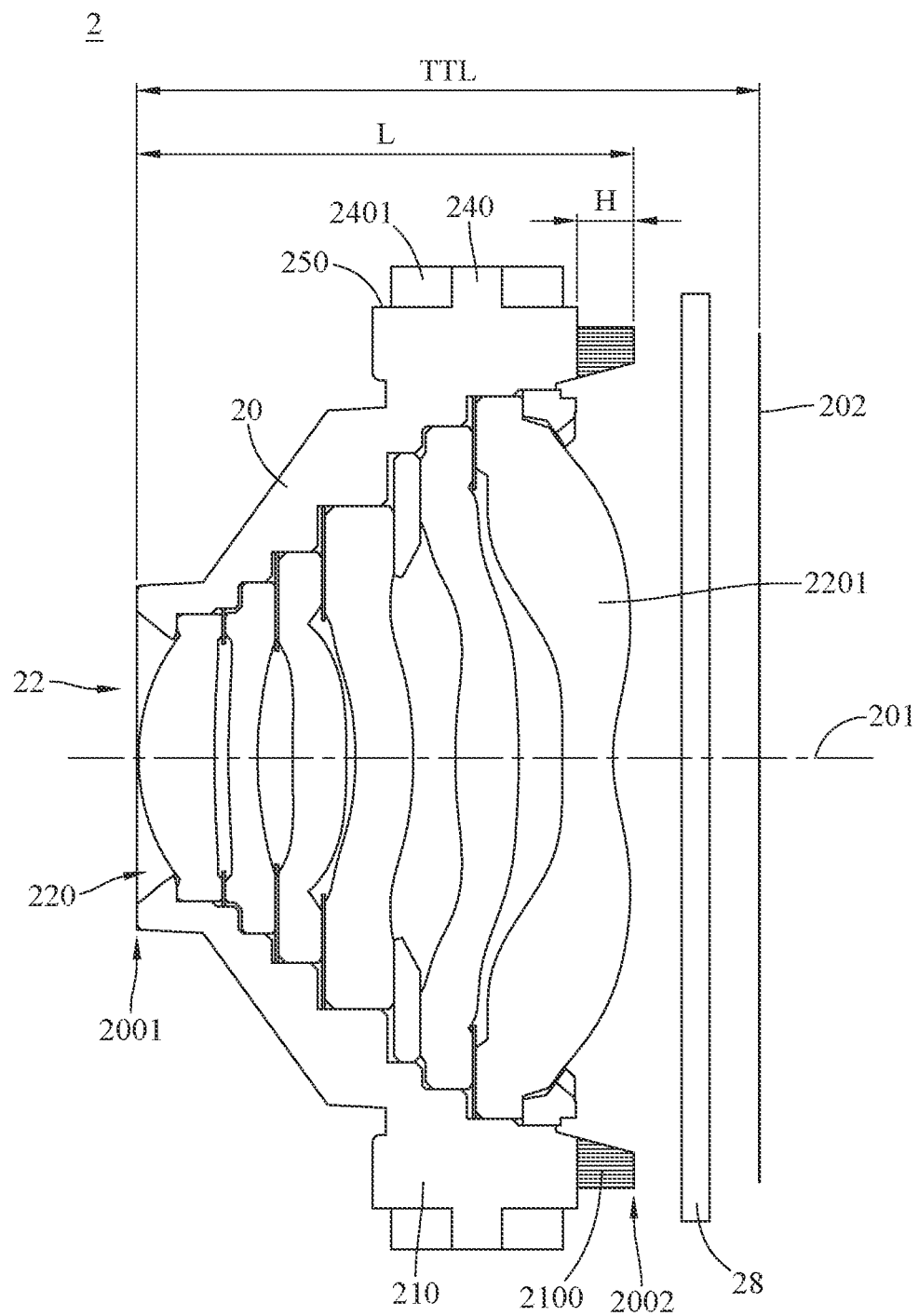
FIG. 6 is a cross-sectional view of an imaging lens system according to the 2nd embodiment of the present disclosure.
Figure 7:
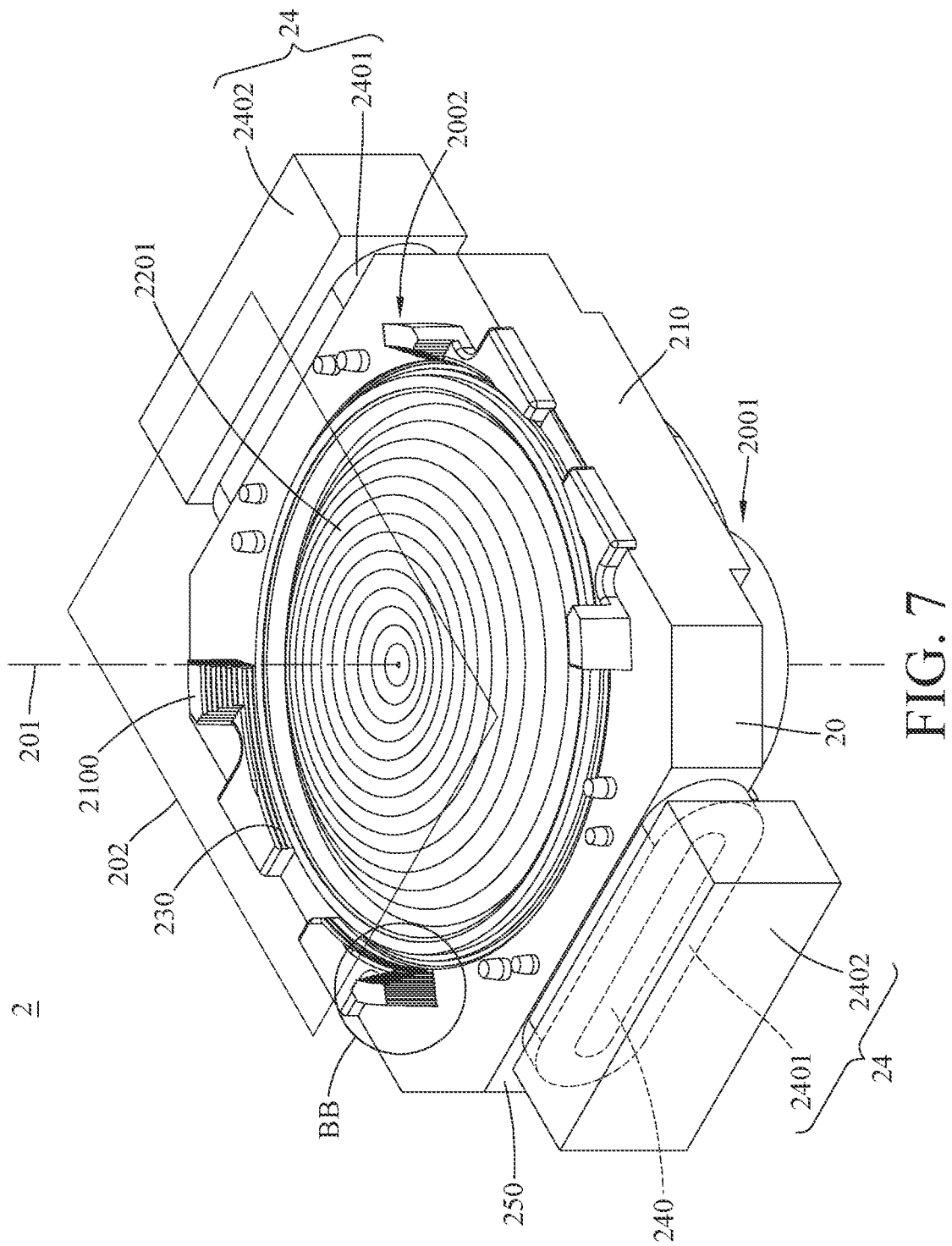
FIG. 7 is a perspective view of the imaging lens system in FIG. 6.
Figure 8:
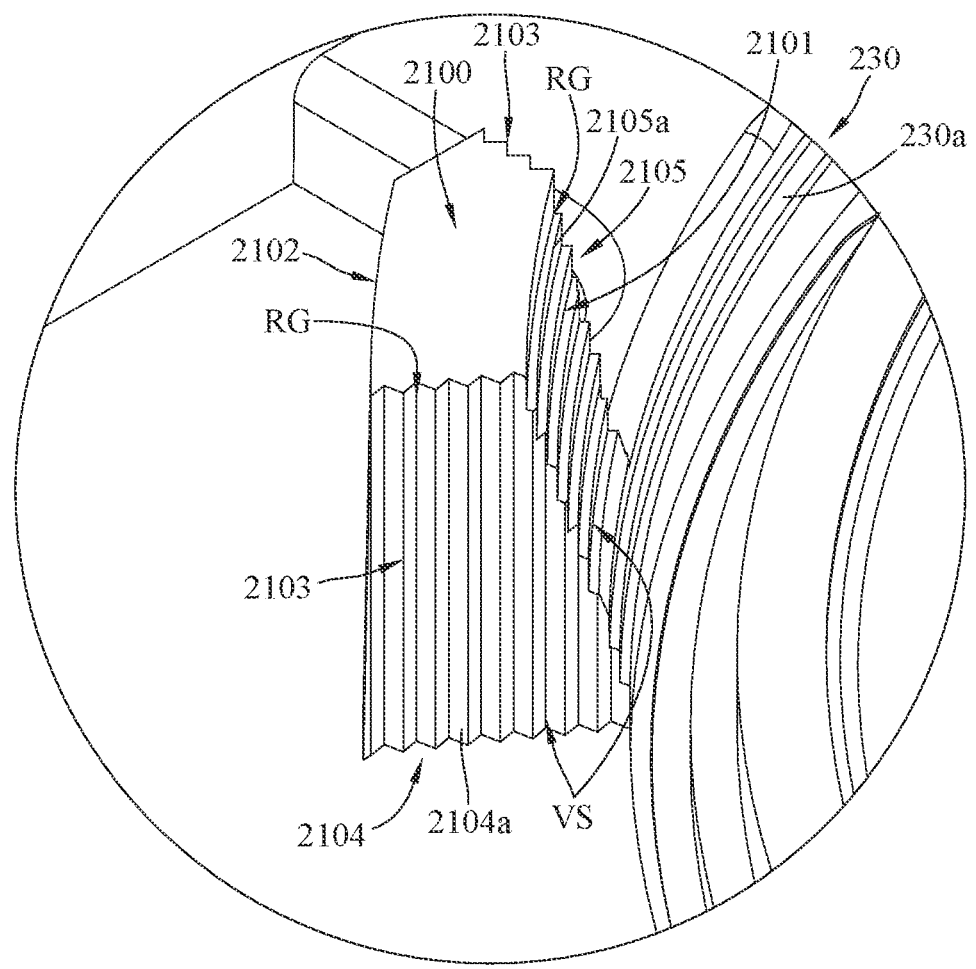
FIG. 8 is an enlarged view of the BB region of the imaging lens system in FIG. 7.
Figure 9:
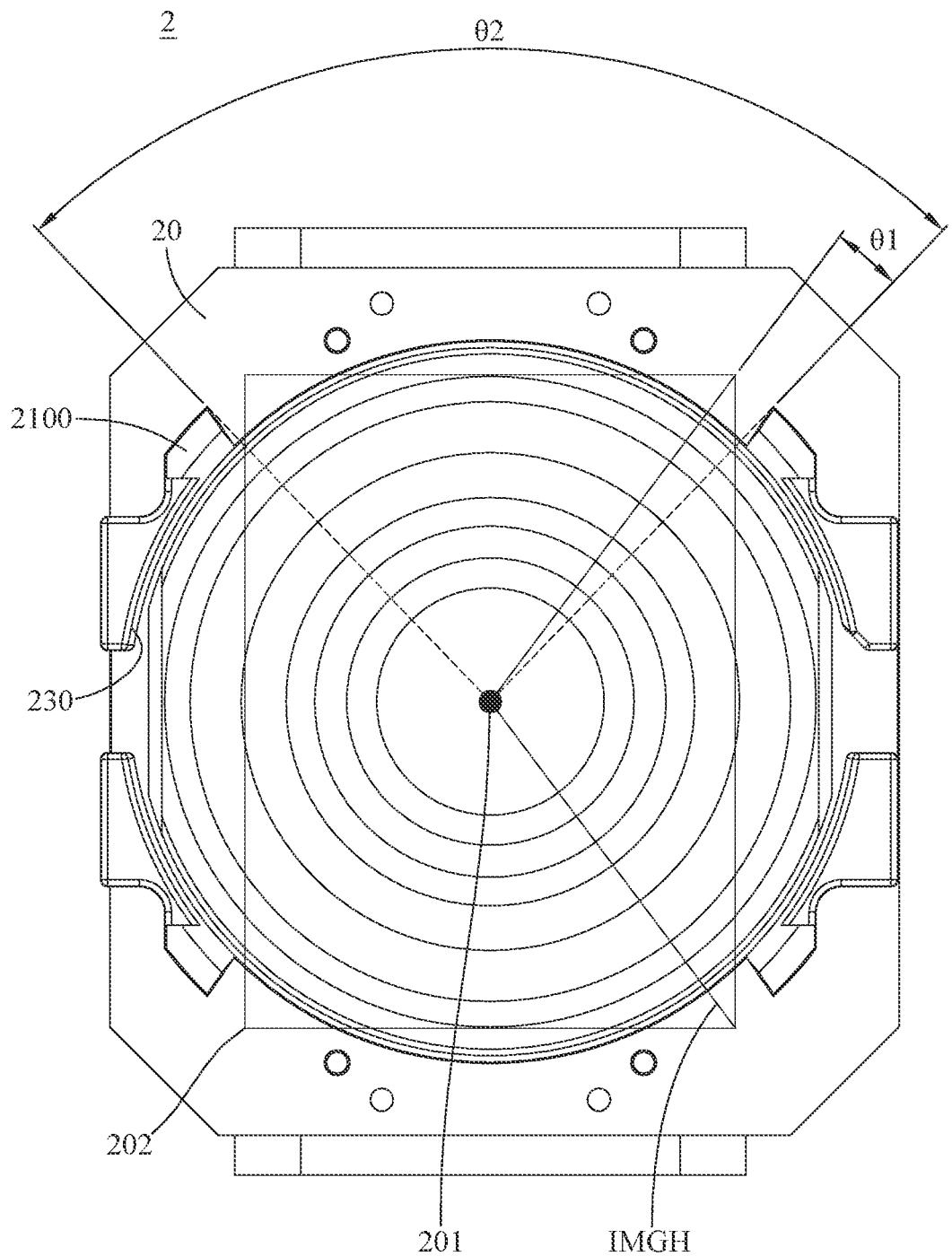
FIG. 9 is a bottom view of the imaging lens system in FIG. 6 viewing from the image side.

Please refer to FIG. 6 to FIG. 9, where FIG. 6 is a cross-sectional view of an imaging lens system according to the 2nd embodiment of the present disclosure, FIG. 7 is a perspective view of the imaging lens system in FIG. 6, FIG. 8 is an enlarged view of the BB region of the imaging lens system in FIG. 7, and FIG. 9 is a bottom view of the imaging lens system in FIG. 6 viewing from the image side.

In this embodiment, an imaging lens system 2 has an optical axis 201 and an image surface 202. The optical axis 201 passes through the geometric center of the image surface 202, and the image surface 202 has an appearance of a rectangle as shown in FIG. 9. The imaging lens system 2 includes a plastic lens barrel 20, a plurality of optical elements 22 and two driving assemblies 24, the plastic lens barrel 20 surrounds the optical axis 201, the optical elements 22 are received in the plastic lens barrel 20, the optical axis 201 passes through the optical elements 22, and the driving assemblies 24 are disposed outside the plastic lens barrel 20. The optical elements 22 include, for example, a lens element, a light-blocking element, an aperture stop, a stop, a spacer, a retainer, etc., and the present disclosure is not limited thereto.

The plastic lens barrel 20 has an object side end 2001 facing an object side (e.g., the left side of FIG. 6) and an image side end 2002 facing an image side (e.g., the right side of FIG. 6) and the image surface 202. As shown in FIG. 9, the plastic lens barrel 20 has a cross section at the image side end 2002 being a chamfered rectangle when viewing the imaging lens system 2 from the image side.

The plastic lens barrel 20 includes an image-side portion 210 and an object-side aperture 220. The image-side portion 210 is located at the image side end 2002 and between the image surface 202 and the object-side aperture 220. The object-side aperture 220 is located at the object side end 2001, and the optical axis 201 passes through the object-side aperture 220. The object-side aperture 220 can be used as an aperture opening of the imaging lens system 2 for light incident into the optical elements 22 in the plastic lens barrel 20.

The image-side portion 210 includes four protrusive structures 2100. Two of the protrusive structures 2100 are disposed opposite to each other in opposite orientation relative to the optical axis 201, while another two of the protrusive structures 2100 are disposed opposite to each other in opposite orientation relative to the optical axis 201. Specifically, the four protrusive structures 2100 surround the optical axis 201. The protrusive structures 2100 extend towards the image surface 202. Each of the protrusive structures 2100 has an inner surface 2101, an outer surface 2102 and two reflection-reducing surfaces 2103. Each of the inner surfaces 2101 faces the optical axis 201. The outer surfaces 2102 are respectively disposed opposite to the inner surfaces 2101, and the outer surfaces 2102 are respectively located farther away from the optical axis 201 than the inner surfaces 2101. The reflection-reducing surfaces 2103 extend along directions towards the image surface 202; in other words, the extending directions of the reflection-reducing surfaces 2103 are towards the image surface 202. The reflection-reducing surfaces 2103 are connected to and located between the inner surfaces 2101 and the outer surfaces 2102.

Each of the protrusive structures 2100 includes two first reflection-reducing structures 2104 and a second reflection-reducing structure 2105. The first reflection-reducing structures 2104 are respectively disposed on the reflection-reducing surfaces 2103. The second reflection-reducing structures 2105 are respectively disposed on the inner surfaces 2101, and the second reflection-reducing structures 2105 are connected to and located between the first reflection-reducing structures 2104.

Each of the first reflection-reducing structures 2104 includes a plurality of long protrusions 2104a arranged side by side and extending towards the image-side portion 210 from the object-side aperture 220, and the long protrusions 2104a have cross sections in directions perpendicular to the optical axis 201 being triangular. The long protrusions 2104a which are arranged side by side form a V-shaped structure VS, and adjacent two of the long protrusions 2104a form a reflection-reducing groove RG therebetween.

Each of the second reflection-reducing structures 2105 includes a plurality of long protrusions 2105a arranged side by side and extending along a circumferential direction which takes the optical axis 201 as the central axis thereof, and the long protrusions 2105a have cross sections in a direction facing towards the image-side portion 210 from the object-side aperture 220 being triangular. The long protrusions 2105a which are arranged side by side also form a V-shaped structure VS, and adjacent two of the long protrusions 2105a form a reflection-reducing groove RG therebetween. In addition, the connected two first reflection-reducing structures 2104 and one second reflection-reducing structure 2105 have a cross section being U-shaped in a direction perpendicular to the optical axis 201.

The plastic lens barrel 20 further includes third reflection-reducing structures 230 at the image side end 2002 thereof, and each of the third reflection-reducing structures 230 includes a plurality of long protrusions 230a. The long protrusions 230a of the third reflection-reducing structures 230 are located on surfaces facing towards the optical axis 201, extend along the circumferential direction which takes the optical axis 201 as the central axis thereof and are connected to the long protrusions 2105a of the second reflection-reducing structures 2105 of the protrusive structures 2100. The long protrusions 230a have cross sections being triangular. The long protrusions 230a which are arranged side by side also form a V-shaped structure VS, and adjacent two of the long protrusions 230a form a reflection-reducing groove RG therebetween.

The abovementioned long protrusions 2104a of the first reflection-reducing structures 2104, the abovementioned long protrusions 2105a of the second reflection-reducing structures 2105 and the abovementioned long protrusions 230a of the third reflection-reducing structures 230 are similar to the long protrusions 5104a with triangular cross sections as shown in FIG. 22. However, the present disclosure is not limited thereto. The first reflection-reducing structures 2104, the second reflection-reducing structures 2105 or the third reflection-reducing structures 230 may also include long protrusions 6104a, 7104a or 9104a as shown in FIG. 23, FIG. 24 or FIG. 26 or tapered protrusions 8104b as shown in FIG. 25.

The optical elements 22 include a most-image-side optical element 2201 which is a lens element and is located closer to the image surface 202 than the other optical elements in the plastic lens barrel 20. The protrusive structures 2100 are located closer to the image surface 202 than the most-image-side optical element 2201 along a direction parallel to the optical axis 201.

The plastic lens barrel 20 further includes two mounting structures 240 respectively disposed on two opposite outer surfaces 250 of the plastic lens barrel symmetric to the optical axis 201 and protruding in a direction away from the optical axis 201. Each of the driving assemblies 24 includes a coil 2401 and a magnet component 2402, the coils 2401 are disposed on the mounting structures 240, and the magnet components 2402 are disposed corresponding to the coils 2401. The coils 2401 and the magnet components 2402 can drive the imaging lens system 2 to move along the direction parallel to the optical axis 201 or to move and rotate along a direction perpendicular to the optical axis 201 by an electromagnetic force generated by an electromagnetic interaction between the coils 2401 and the magnet components 2402.

The imaging lens system 2 further includes a filter 28. The filter 28 is made of glass material and located between the most-image-side optical element 2201 and the image surface 202, and will not affect a focal length of the imaging lens system 2.

When a physical length along the direction parallel to the optical axis 201 of each of the protrusive structures 2100 is H, and a physical length along the direction parallel to the optical axis 201 of the imaging lens system 2 is L, the following conditions are satisfied: H=0.855 [mm]; L=7.5 [mm]; and H/L×100%=11.4%.

When a minimum angle between a line in a direction perpendicular to the optical axis 201 from one of the protrusive structures 2100 to the optical axis 201 and a line in a direction perpendicular to the optical axis 201 from an internal angle of the rectangular image surface 202 to the optical axis 201 is θ1, the following condition is satisfied: θ1=8 [deg.].

When a minimum angle between two lines in directions perpendicular to the optical axis 201 from adjacent two of the protrusive structures 2100 to the optical axis 201 is θ2, the following condition is satisfied: θ2=88 [deg.].

When a maximum distance along a direction perpendicular to the optical axis 201 from the image surface 202 to the optical axis 201 is IMGH, an axial distance from an object side end of the imaging lens system 2 (i.e., the object side end 2001 of the plastic lens barrel 20 in this embodiment) to the image surface 202 is TTL, and the focal length of the imaging lens system 2 is EFL, the following conditions are satisfied: IMGH=6.4 [mm]; TTL=9.4 [mm]; EFL=7.74 [mm]; and IMGH/[(TTL+EFL)/2]=0.75.

3rd Embodiment

Figure 10:
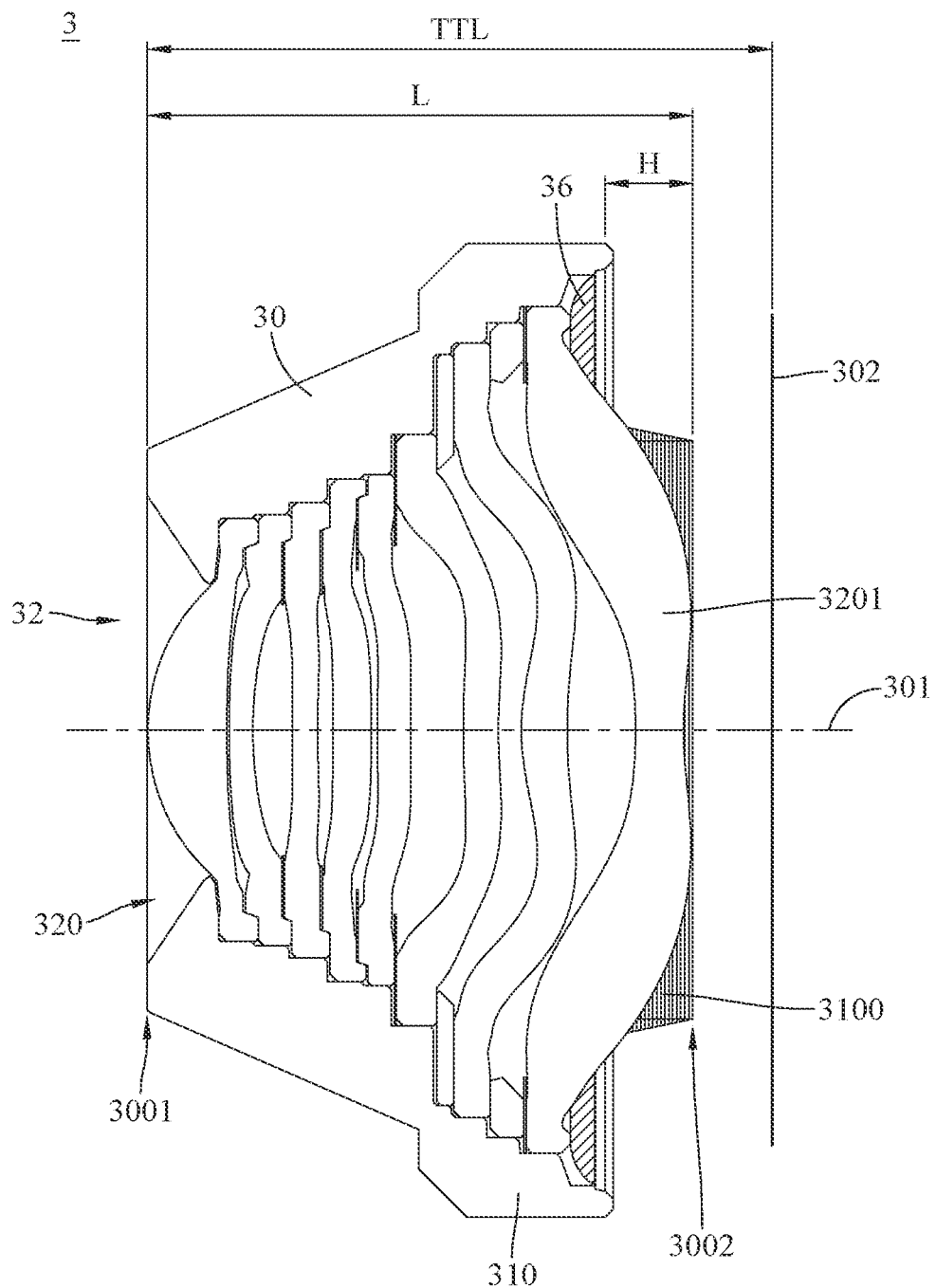
FIG. 10 is a cross-sectional view of an imaging lens system according to the 3rd embodiment of the present disclosure.
Figure 11:
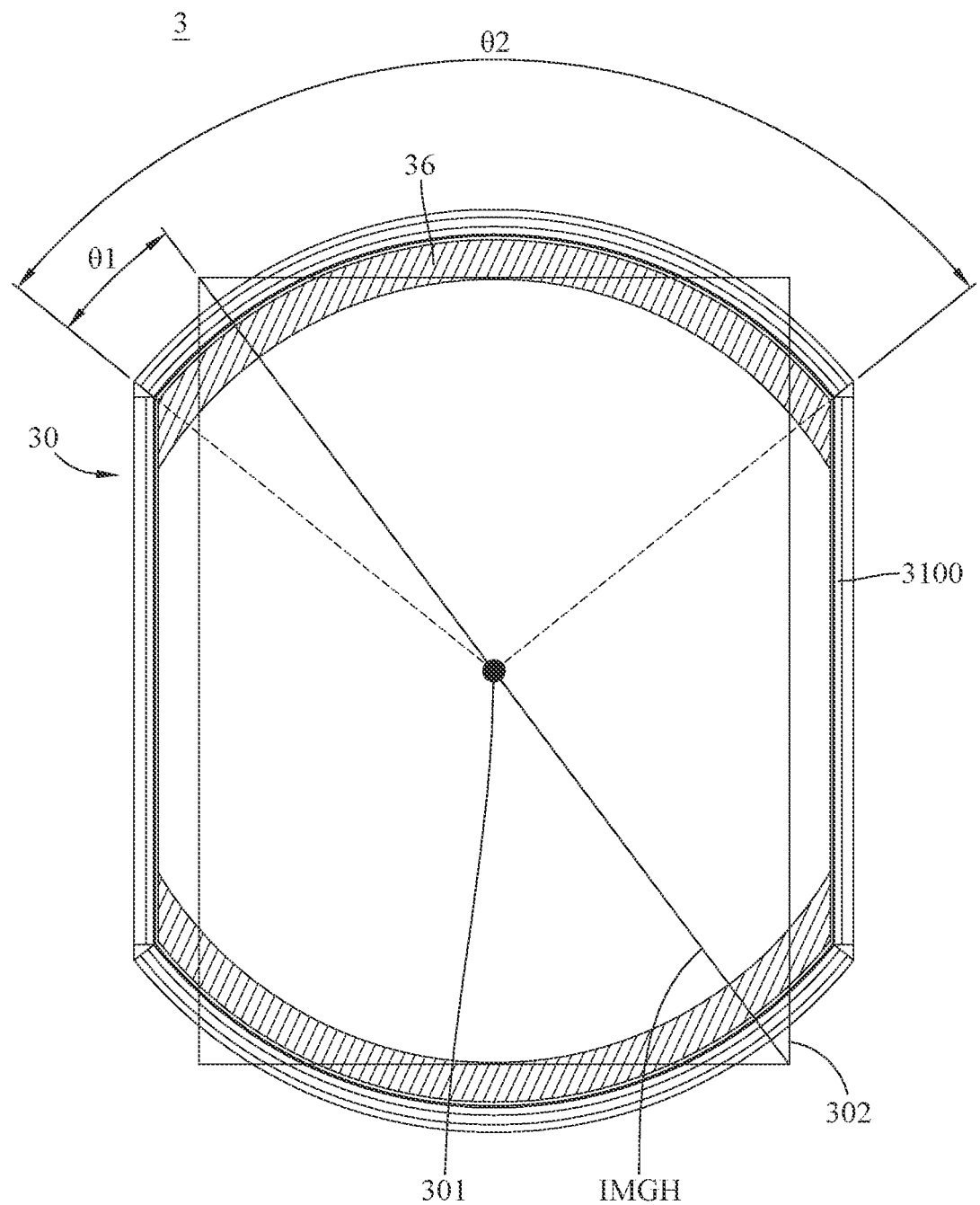
FIG. 11 is a bottom view of the imaging lens system in FIG. 10 viewing from the image side.
Figure 12:
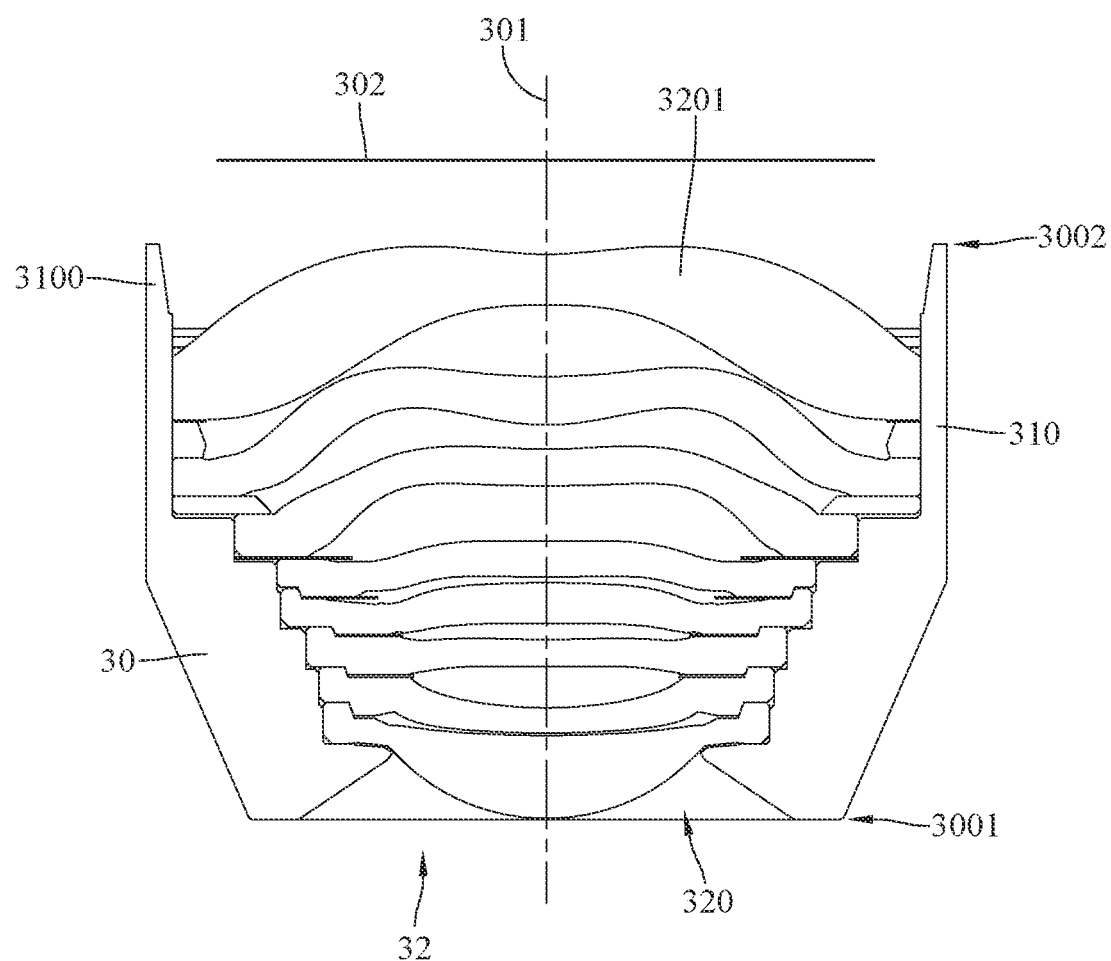
FIG. 12 is another cross-sectional view of the imaging lens system in FIG. 10.
Figure 13:
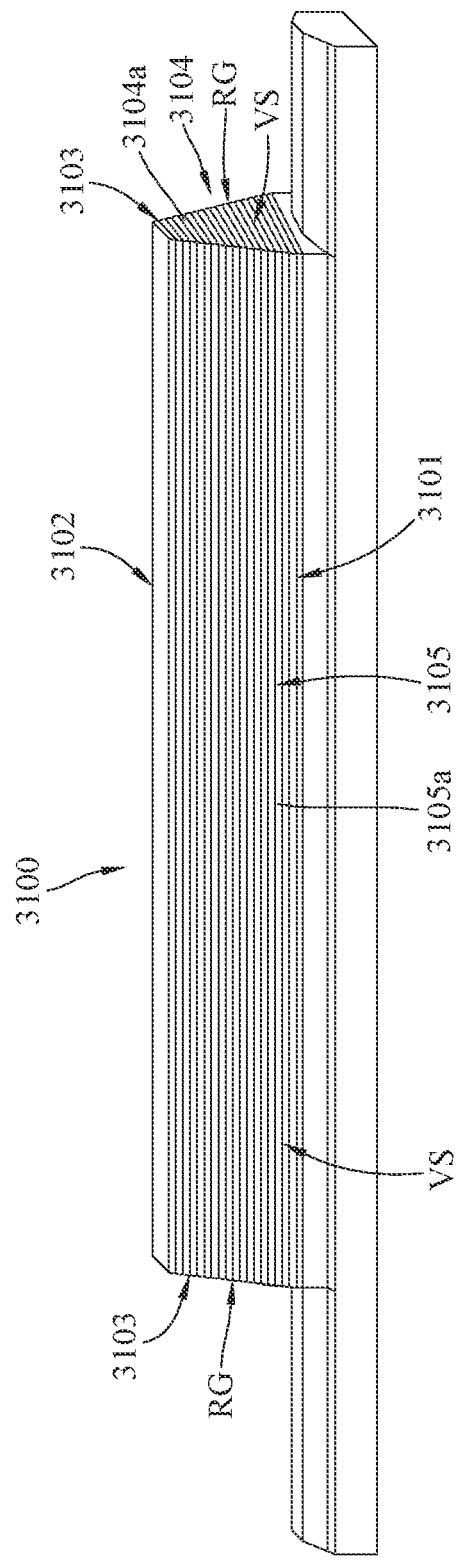
FIG. 13 is an enlarged view of a protrusive structure of the imaging lens system in FIG. 10.

Please refer to FIG. 10 to FIG. 13, where FIG. 10 is a cross-sectional view of an imaging lens system according to the 3rd embodiment of the present disclosure, FIG. 11 is a bottom view of the imaging lens system in FIG. 10 viewing from the image side, FIG. 12 is another cross-sectional view of the imaging lens system in FIG. 10, and FIG. 13 is an enlarged view of a protrusive structure of the imaging lens system in FIG. 10.

In this embodiment, an imaging lens system 3 has an optical axis 301 and an image surface 302. The optical axis 301 passes through the geometric center of the image surface 302, and the image surface 302 has an appearance of a rectangle as shown in FIG. 11. The imaging lens system 3 includes a plastic lens barrel 30 and a plurality of optical elements 32, the plastic lens barrel 30 surrounds the optical axis 301, the optical elements 32 are received in the plastic lens barrel 30, and the optical axis 301 passes through the optical elements 32. The optical elements 32 include, for example, a lens element, a light-blocking element, an aperture stop, a stop, a spacer, a retainer, etc., and the present disclosure is not limited thereto.

The plastic lens barrel 30 has an object side end 3001 facing an object side (e.g., the left side of FIG. 10) and an image side end 3002 facing an image side (e.g., the right side of FIG. 10) and the image surface 302. As shown in FIG. 11, the plastic lens barrel 30 has a cross section at the image side end 3002 being a long oval when viewing the imaging lens system 3 from the image side.

The plastic lens barrel 30 includes an image-side portion 310 and an object-side aperture 320. The image-side portion 310 is located at the image side end 3002 and between the image surface 302 and the object-side aperture 320. The object-side aperture 320 is located at the object side end 3001, and the optical axis 301 passes through the object-side aperture 320. The object-side aperture 320 can be used as an aperture opening of the imaging lens system 3 for light incident into the optical elements 32 in the plastic lens barrel 30.

The image-side portion 310 includes two protrusive structures 3100 disposed opposite to each other in opposite orientation relative to the optical axis 301. Specifically, the protrusive structures 3100 surround the optical axis 301 in long shapes and are disposed axisymmetric to the optical axis 301. The protrusive structures 3100 extend towards the image surface 302. Each of the protrusive structures 3100 has an inner surface 3101, an outer surface 3102 and two reflection-reducing surfaces 3103. Each of the inner surfaces 3101 faces the optical axis 301. The outer surfaces 3102 are respectively disposed opposite to the inner surfaces 3101, and the outer surfaces 3102 are respectively located farther away from the optical axis 301 than the inner surfaces 3101. The reflection-reducing surfaces 3103 extend along directions towards the image surface 302; in other words, the extending directions of the reflection-reducing surfaces 3103 are towards the image surface 302. The reflection-reducing surfaces 3103 are connected to and located between the inner surfaces 3101 and the outer surfaces 3102.

Each of the protrusive structures 3100 includes two first reflection-reducing structures 3104 and a second reflection-reducing structure 3105. The first reflection-reducing structures 3104 are respectively disposed on the reflection-reducing surfaces 3103. The second reflection-reducing structures 3105 are respectively disposed on the inner surfaces 3101, and the second reflection-reducing structures 3105 are connected to and located between the first reflection-reducing structures 3104.

Each of the first reflection-reducing structures 3104 includes a plurality of long protrusions 3104a arranged side by side along the optical axis 301, and the long protrusions 3104a have cross sections in a direction parallel to the optical axis 301 being arc-shaped. The long protrusions 3104a which are arranged side by side form a V-shaped structure VS, and adjacent two of the long protrusions 3104a form a reflection-reducing groove RG therebetween.

Each of the second reflection-reducing structures 3105 includes a plurality of long protrusions 3105a arranged side by side and extending along directions perpendicular to the optical axis 301, and the long protrusions 3105a have cross sections in directions perpendicular to the optical axis 301 being arc-shaped. The long protrusions 3105a which are arranged side by side also form a V-shaped structure VS, and adjacent two of the long protrusions 3105a form a reflection-reducing groove RG therebetween. In addition, the connected two first reflection-reducing structures 3104 and one second reflection-reducing structure 3105 have a cross section being U-shaped in a direction perpendicular to the optical axis 301.

The abovementioned long protrusions 3104a of the first reflection-reducing structures 3104 and the abovementioned long protrusions 3105a of the second reflection-reducing structures 3105 are similar to the long protrusions 7104a with arc-shaped cross sections as shown in FIG. 24. However, the present disclosure is not limited thereto. The first reflection-reducing structures 3104 or the second reflection-reducing structures 3105 may also include long protrusions 5104a, 6104a or 9104a as shown in FIG. 22, FIG. 23 or FIG. 26 or tapered protrusions 8104b as shown in FIG. 25.

The optical elements 32 include a most-image-side optical element 3201 which is a lens element and is located closer to the image surface 302 than the other optical elements in the plastic lens barrel 30. The protrusive structures 3100 are located closer to the image surface 302 than the most-image-side optical element 3201 along the direction parallel to the optical axis 301.

The imaging lens system 3 further includes two gelatinous substances 36 symmetrically surrounding the optical axis 301 and oppositely located between the two protrusive structures 3100. The gelatinous substances 36 are located between peripheral areas of the most-image-side optical element 3201 and the protrusive structures 3100 along the direction parallel to the optical axis 301.

When a physical length along the direction parallel to the optical axis 301 of each of the protrusive structures 3100 is H, and a physical length along the direction parallel to the optical axis 301 of the imaging lens system 3 is L, the following conditions are satisfied: H=1.1 [mm]; L=6.83 [mm]; and H/L×100%=16.1%.

When a minimum angle between a line in a direction perpendicular to the optical axis 301 from one of the protrusive structures 3100 to the optical axis 301 and a line in a direction perpendicular to the optical axis 301 from an internal angle of the rectangular image surface 302 to the optical axis 301 is θ1, the following condition is satisfied: θ1=14 [deg.].

When a minimum angle between two lines in directions perpendicular to the optical axis 301 from adjacent two of the protrusive structures 3100 to the optical axis 301 is θ2, the following condition is satisfied: θ2=102 [deg.].

When a maximum distance along a direction perpendicular to the optical axis 301 from the image surface 302 to the optical axis 301 is IMGH, an axial distance from an object side end of the imaging lens system 3 (i.e., the object side end 3001 of the plastic lens barrel 30 in this embodiment) to the image surface 302 is TTL, and a focal length of the imaging lens system 3 is EFL, the following conditions are satisfied: IMGH=6.5 [mm]; TTL=7.8 [mm]; EFL=6.72 [mm]; and IMGH/[(TTL+EFL)/2]=0.90.

4th Embodiment

Figure 14:
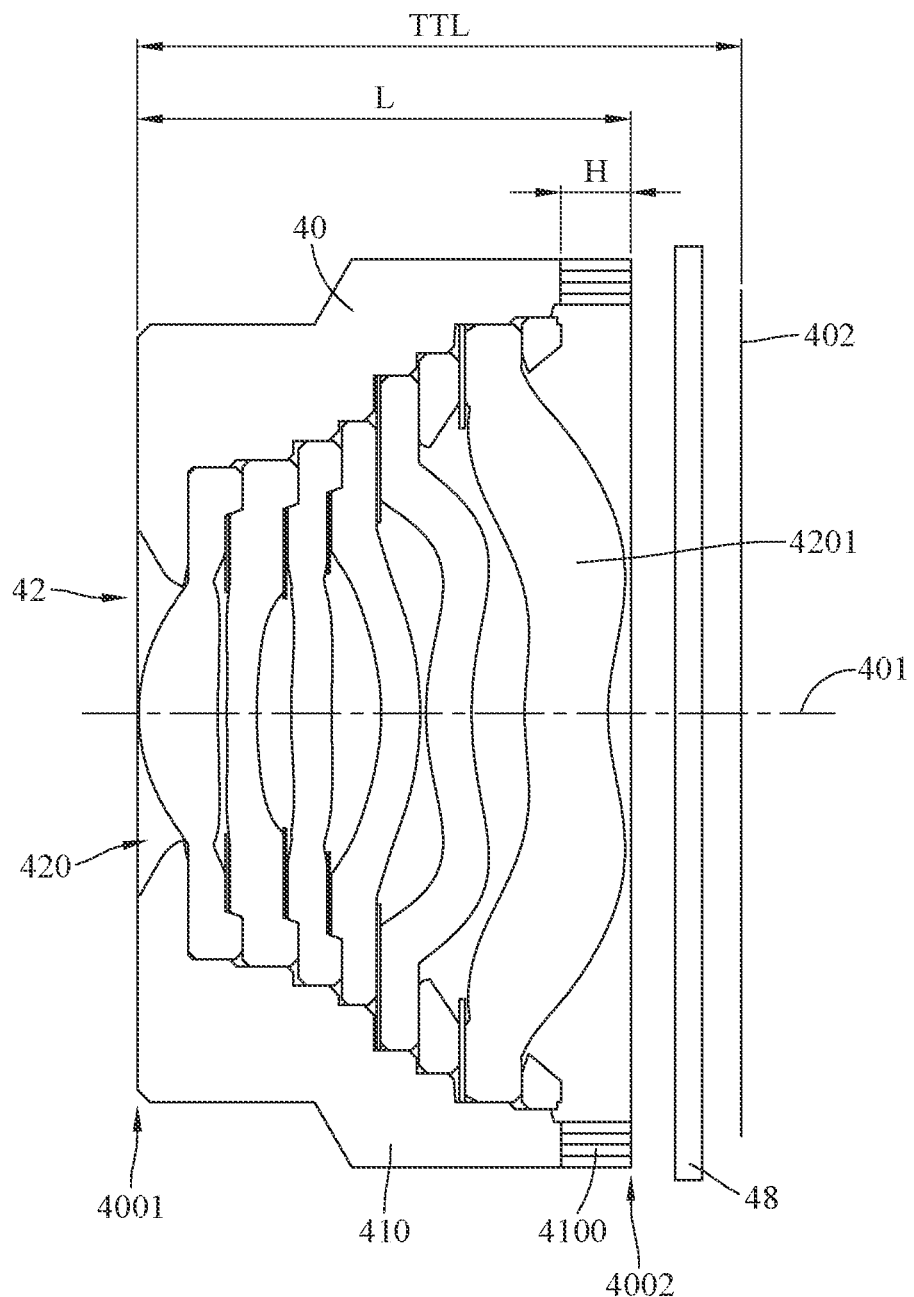
FIG. 14 is a cross-sectional view of an imaging lens system according to the 4th embodiment of the present disclosure.
Figure 15:
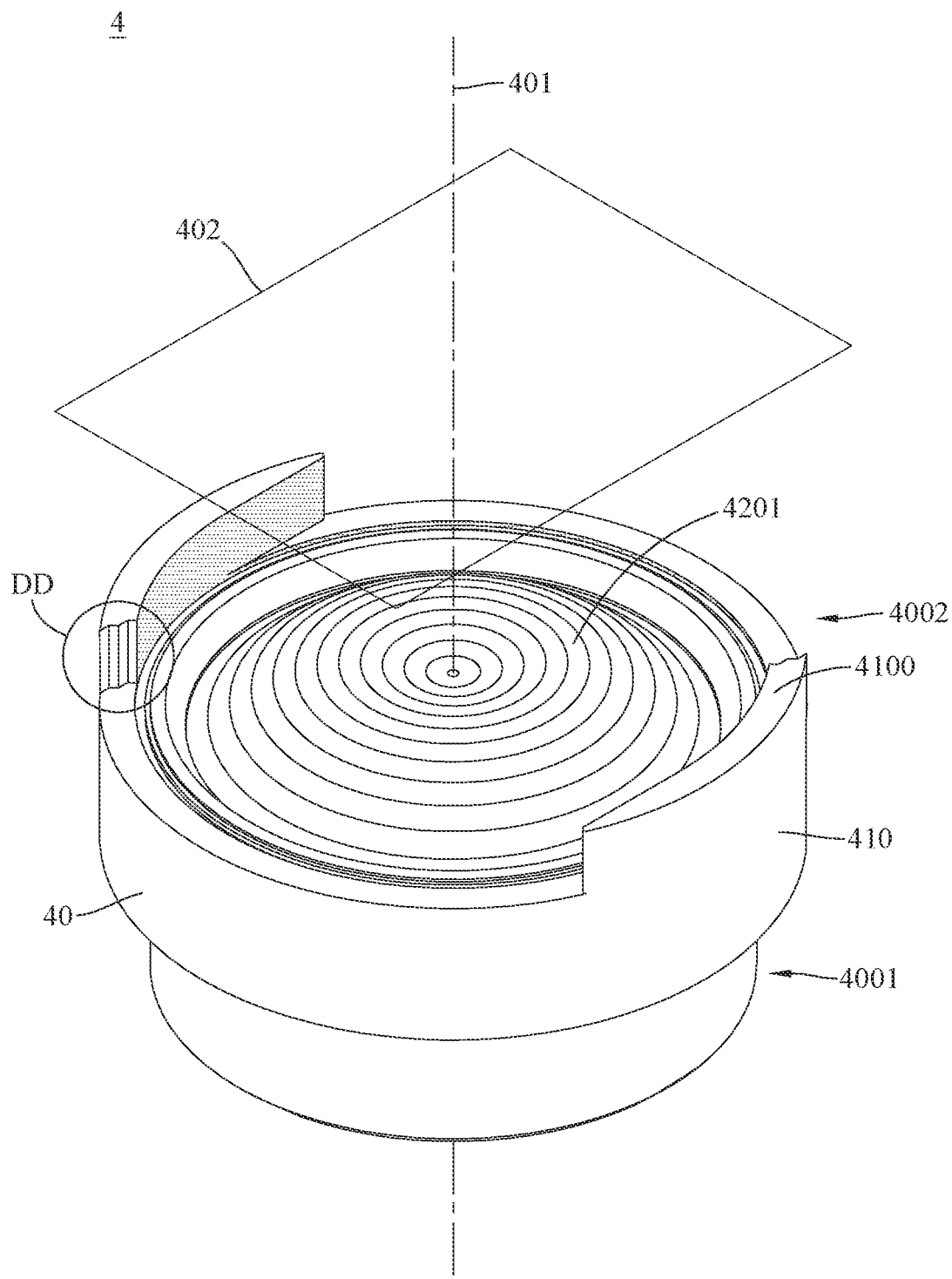
FIG. 15 is a perspective view of the imaging lens system in FIG. 14.
Figure 16:
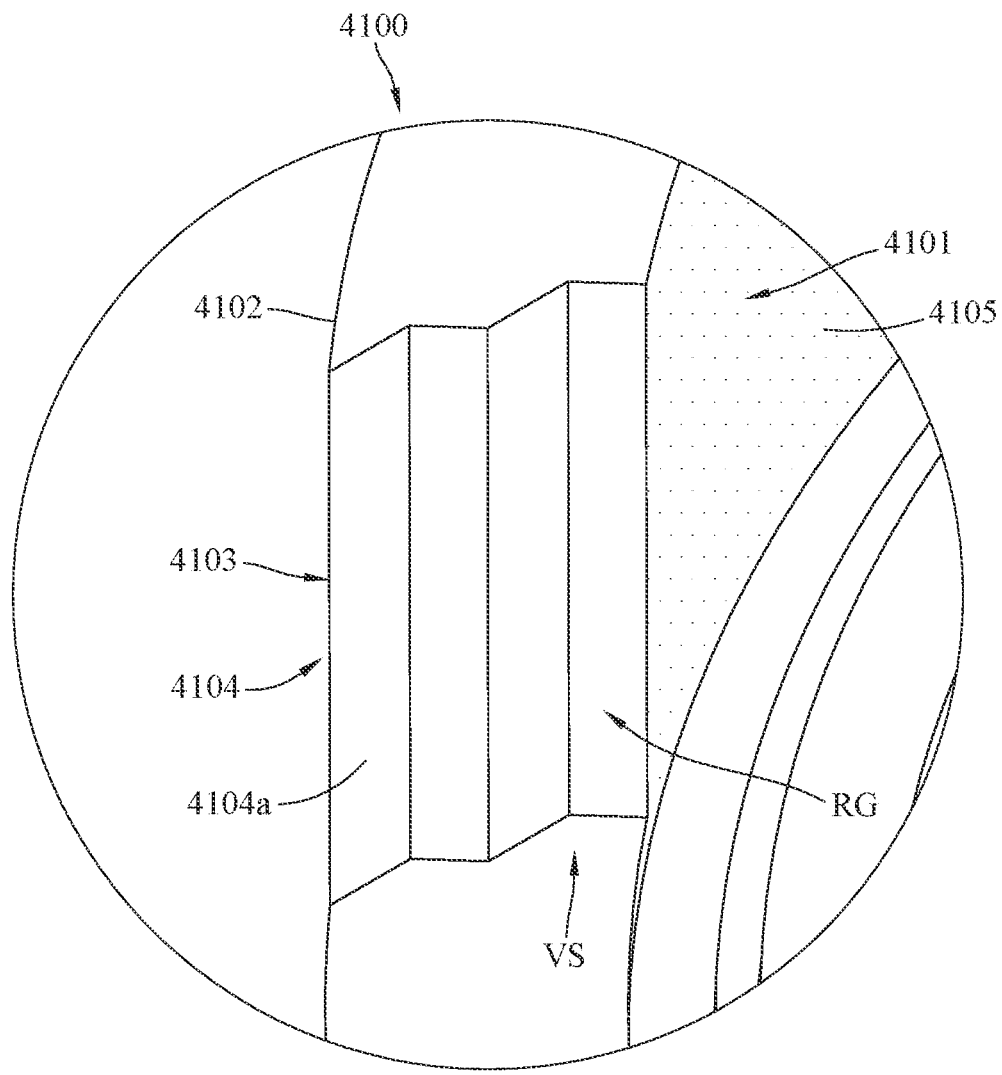
FIG. 16 is an enlarged view of the DD region of the imaging lens system in FIG. 15.
Figure 17:
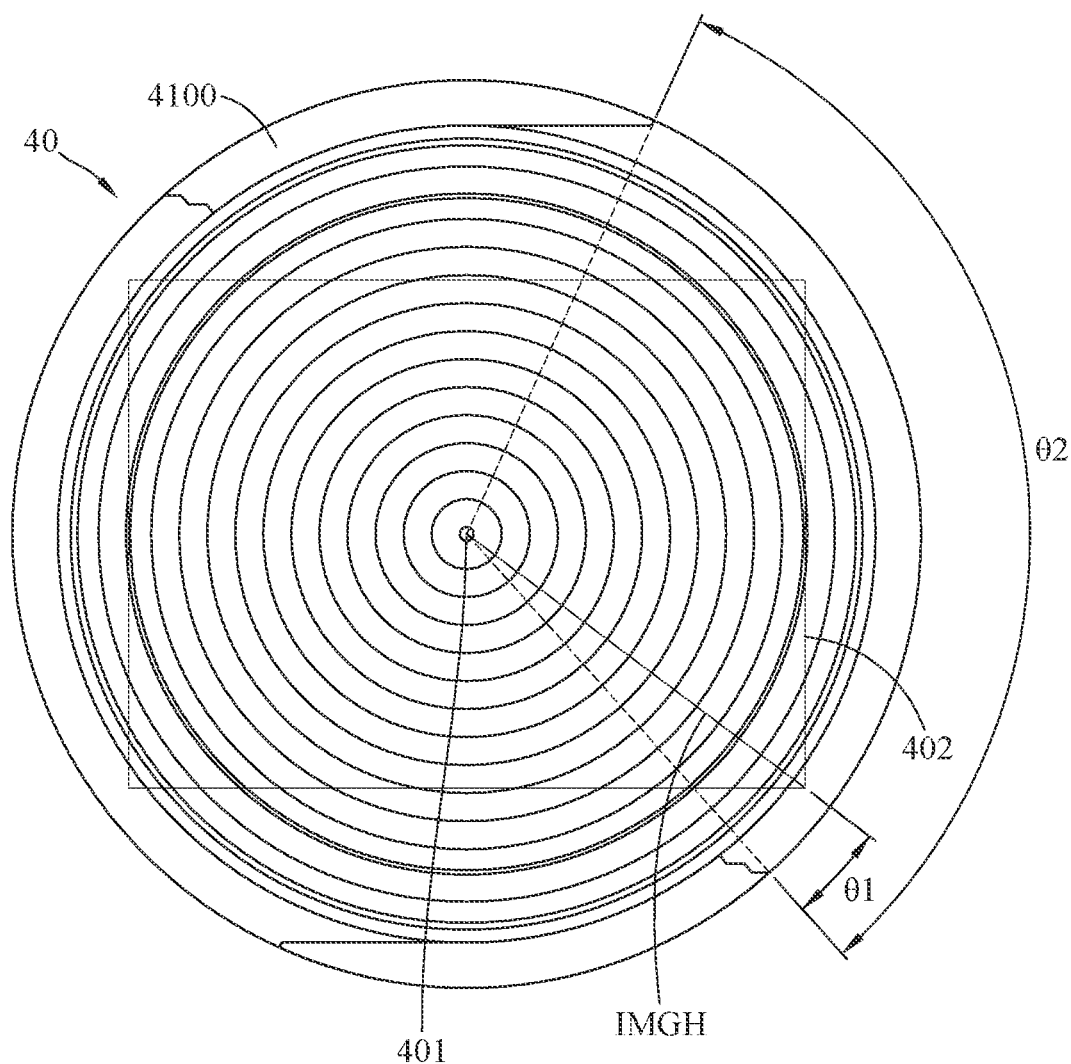
FIG. 17 a bottom view of the imaging lens system in FIG. 14 viewing from the image side.

Please refer to FIG. 14 to FIG. 17, where FIG. 14 is a cross-sectional view of an imaging lens system according to the 4th embodiment of the present disclosure, FIG. 15 is a perspective view of the imaging lens system in FIG. 14, FIG. 16 is an enlarged view of the DD region of the imaging lens system in FIG. 15, and FIG. 17 a bottom view of the imaging lens system in FIG. 14 viewing from the image side.

In this embodiment, an imaging lens system 4 has an optical axis 401 and an image surface 402. The optical axis 401 passes through the geometric center of the image surface 402, and the image surface 402 has an appearance of a rectangle as shown in FIG. 17. The imaging lens system 4 includes a plastic lens barrel 40 and a plurality of optical elements 42, the plastic lens barrel 40 surrounds the optical axis 401, the optical elements 42 are received in the plastic lens barrel 40, and the optical axis 401 passes through the optical elements 42. The optical elements 42 include, for example, a lens element, a light-blocking element, an aperture stop, a stop, a spacer, a retainer, etc., and the present disclosure is not limited thereto.

The plastic lens barrel 40 has an object side end 4001 facing an object side (e.g., the left side of FIG. 14) and an image side end 4002 facing an image side (e.g., the right side of FIG. 14) and the image surface 402. As shown in FIG. 17, the plastic lens barrel 40 has a cross section at the image side end 4002 being a circle when viewing the imaging lens system 4 from the image side.

The plastic lens barrel 40 includes an image-side portion 410 and an object-side aperture 420. The image-side portion 410 is located at the image side end 4002 and between the image surface 402 and the object-side aperture 420. The object-side aperture 420 is located at the object side end 4001, and the optical axis 401 passes through the object-side aperture 420. The object-side aperture 420 can be used as an aperture opening of the imaging lens system 4 for light incident into the optical elements 42 in the plastic lens barrel 40.

The image-side portion 410 includes two protrusive structures 4100 disposed opposite to each other in opposite orientation relative to the optical axis 401. Specifically, the protrusive structures 4100 surround the optical axis 401 in arc shapes and are disposed axisymmetric to the optical axis 401. The protrusive structures 4100 extend towards the image surface 402. Each of the protrusive structures 4100 has an inner surface 4101, an outer surface 4102 and a reflection-reducing surface 4103. Each of the inner surfaces 4101 faces the optical axis 401. The outer surfaces 4102 are respectively disposed opposite to the inner surfaces 4101, and the outer surfaces 4102 are respectively located farther away from the optical axis 401 than the inner surfaces 4101. The reflection-reducing surfaces 4103 extend along directions towards the image surface 402; in other words, the extending directions of the reflection-reducing surfaces 4103 are towards the image surface 402. The reflection-reducing surfaces 4103 are connected to and located between the inner surfaces 4101 and the outer surfaces 4102.

Each of the protrusive structures 4100 includes a first reflection-reducing structures 4104 and a second reflection-reducing structure 4105. The first reflection-reducing structures 4104 are respectively disposed on the reflection-reducing surfaces 4103. The second reflection-reducing structures 4105 are respectively disposed on the inner surfaces 4101.

Each of the first reflection-reducing structures 4104 includes a plurality of long protrusions 4104a arranged side by side and extending towards the image-side portion 410 from the object-side aperture 420, and the long protrusions 4104a have cross sections in directions perpendicular to the optical axis 401 being triangular. The long protrusions 4104a which are arranged side by side form a V-shaped structure VS, and adjacent two of the long protrusions 4104a form a reflection-reducing groove RG therebetween.

Each of the second reflection-reducing structures 4105 has a roughened surface so as to achieve the same reflection-reducing effect as that of the abovementioned reflection-reducing groove RG, wherein the roughened surfaces of the second reflection-reducing structures 4105 can be manufactured by a subtractive manufacture such as sandblasting and etching or an additive manufacture such as transfer and coating.

The abovementioned long protrusions 4104a of the first reflection-reducing structures 4104 are similar to the long protrusions 5104a with triangular cross sections as shown in FIG. 22. However, the present disclosure is not limited thereto. The first reflection-reducing structures 4104 may also include long protrusions 6104a, 7104a or 9104a as shown in FIG. 23, FIG. 24 or FIG. 26 or tapered protrusions 8104b as shown in FIG. 25.

The optical elements 42 include a most-image-side optical element 4201 which is a lens element and is located closer to the image surface 402 than the other optical elements in the plastic lens barrel 40. The protrusive structures 4100 are located closer to the image surface 402 than the most-image-side optical element 4201 along the direction parallel to the optical axis 401.

The imaging lens system 4 further includes a filter 48. The filter 48 is made of glass material and located between the most-image-side optical element 4201 and the image surface 402, and will not affect a focal length of the imaging lens system 4.

When a physical length along the direction parallel to the optical axis 401 of each of the protrusive structures 4100 is H, and a physical length along the direction parallel to the optical axis 401 of the imaging lens system 4 is L, the following conditions are satisfied: H=0.54 [mm]; L=3.80 [mm]; and H/L×100%=14.2%.

When a minimum angle between a line in a direction perpendicular to the optical axis 401 from one of the protrusive structures 4100 to the optical axis 401 and a line in a direction perpendicular to the optical axis 401 from an internal angle of the rectangular image surface 402 to the optical axis 401 is θ1, the following condition is satisfied: θ1=11 [deg.].

When a minimum angle between two lines in directions perpendicular to the optical axis 401 from adjacent two of the protrusive structures 4100 to the optical axis 401 is θ2, the following condition is satisfied: θ2=114 [deg.].

When a maximum distance along a direction perpendicular to the optical axis 401 from the image surface 402 to the optical axis 401 is IMGH, an axial distance from an object side end of the imaging lens system 4 (i.e., the object side end 4001 of the plastic lens barrel 40 in this embodiment) to the image surface 402 is TTL, and the focal length of the imaging lens system 4 is EFL, the following conditions are satisfied: IMGH=3.261 [mm]; TTL=4.65 [mm]; EFL=4.58 [mm]; and IMGH/[(TTL+EFL)/2]=0.71.

5th Embodiment

Figure 18:
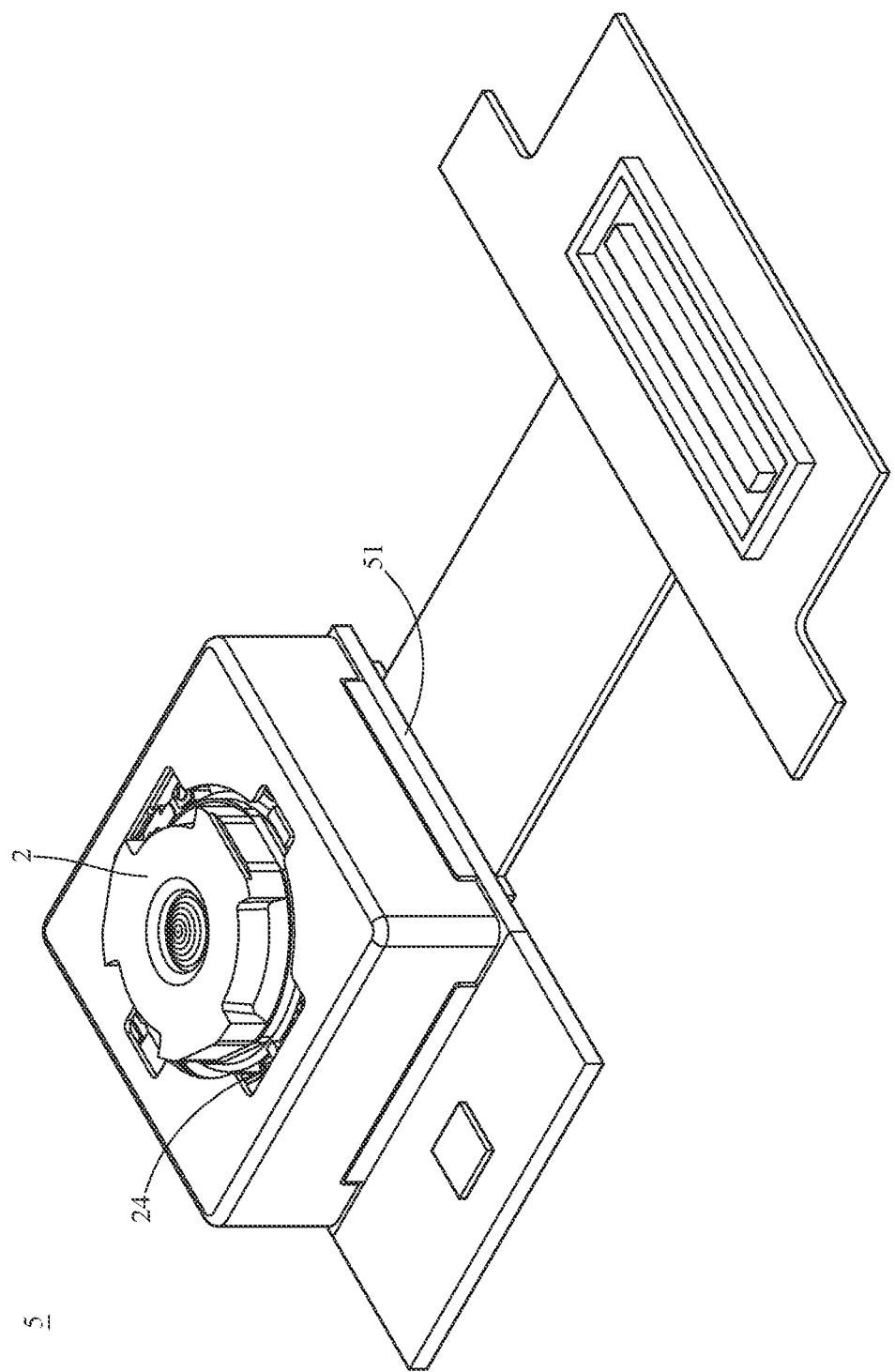
FIG. 18 is a perspective view of an image capturing unit according to the 5th embodiment of the present disclosure.

FIG. 18 is a perspective view of an image capturing unit according to the 5th embodiment of the present disclosure. In this embodiment, an image capturing unit 5 is a camera module including the imaging lens system 2 disclosed in the 2nd embodiment, an image sensor 51 and an image stabilizer (not shown). However, the image capturing unit 5 may alternatively be provided with the imaging lens system disclosed in other abovementioned embodiments, and the present disclosure is not limited thereto. The imaging light converges in the imaging lens system 2 of the image capturing unit 5 to generate an image with the driving assemblies 24 of the imaging lens system 2 utilized for image focusing on the image sensor 51, and the generated image is then digitally transmitted to other electronic component for further processing.

The driving assemblies 24 can have auto focusing functionality, and the different driving configurations can be obtained through not only the electromagnetic force which is generated by the electromagnetic interaction between the coils 2401 and the magnet components 2402 as mentioned in the 2nd embodiment, but also the usages of voice coil motors (VCM), micro electro-mechanical systems (MEMS), piezoelectric systems, or shape memory alloy materials. The driving assemblies 24 are favorable for obtaining a better imaging position of the imaging lens system 2, so that a clear image of the imaged object can be captured by the imaging lens system 2 with different object distances. The image sensor 51 (for example, CCD or CMOS), which can feature high photosensitivity and low noise, is disposed on the image surface 202 (numbered in FIG. 6) of the imaging lens system 2 to provide higher image quality.

The image stabilizer, such as an accelerometer, a gyro sensor and a Hall Effect sensor, is configured to work with the driving assemblies 24 to provide optical image stabilization (OIS). The driving assemblies 24 working with the image stabilizer is favorable for compensating for pan and tilt of the imaging lens system 2 to reduce blurring associated with motion during exposure. In some cases, the compensation can be provided by electronic image stabilization (EIS) with image processing software, thereby improving image quality while in motion or low-light conditions.

6th Embodiment

Figure 19:
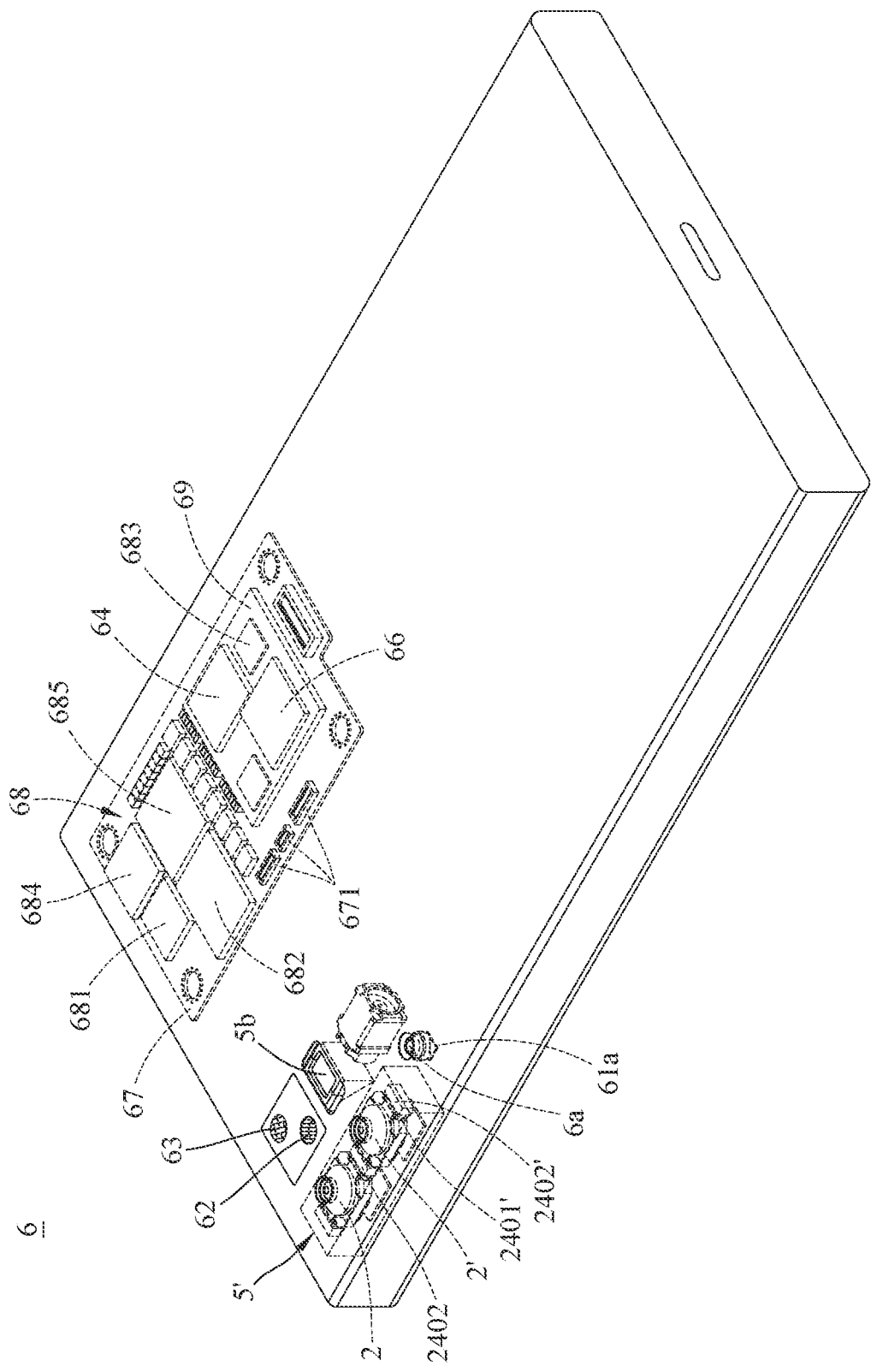
FIG. 19 is one perspective view of an electronic device according to the 6th embodiment of the present disclosure.
Figure 20:
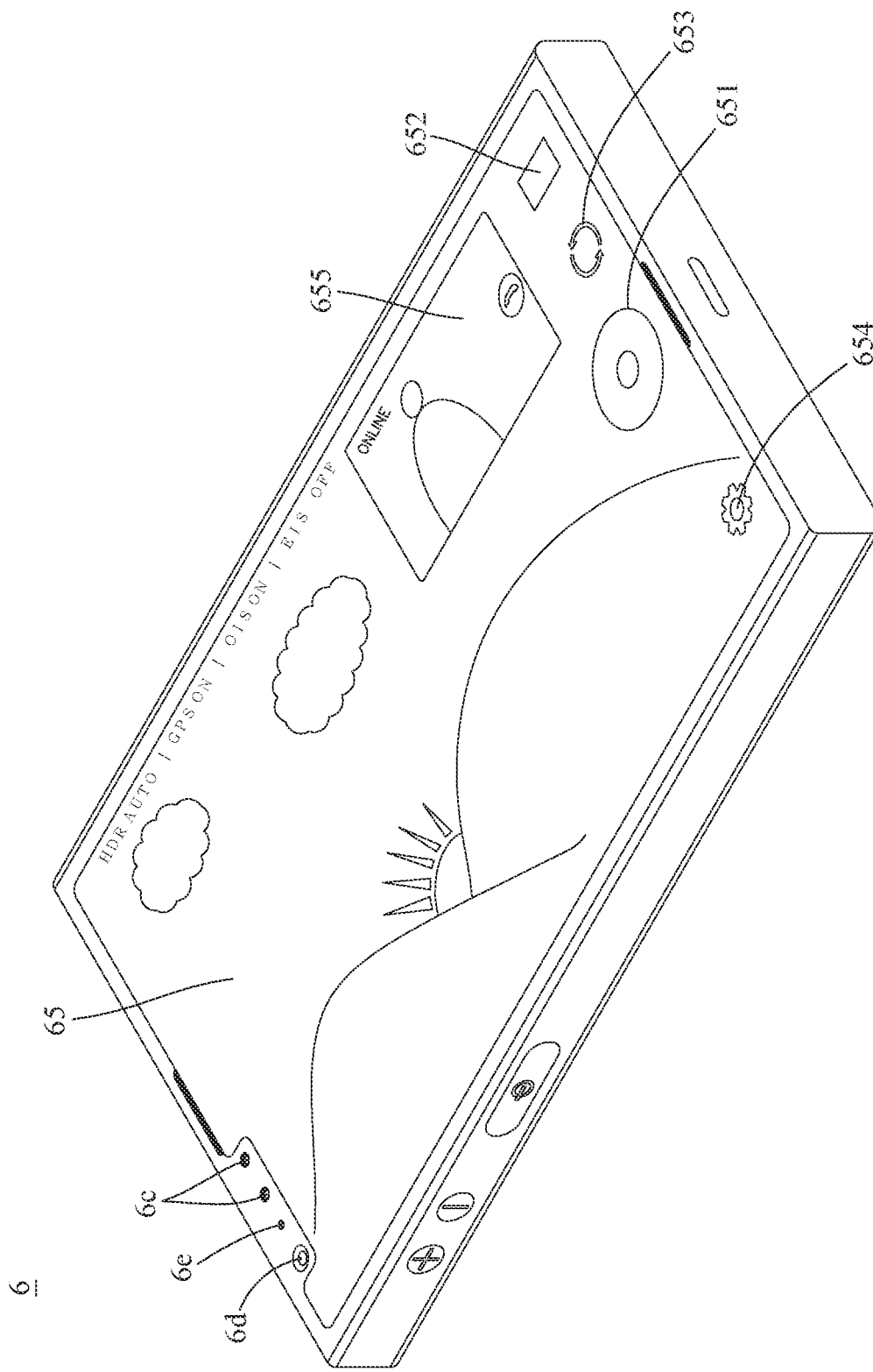
FIG. 20 is another perspective view of the electronic device in FIG. 19.
Figure 21:
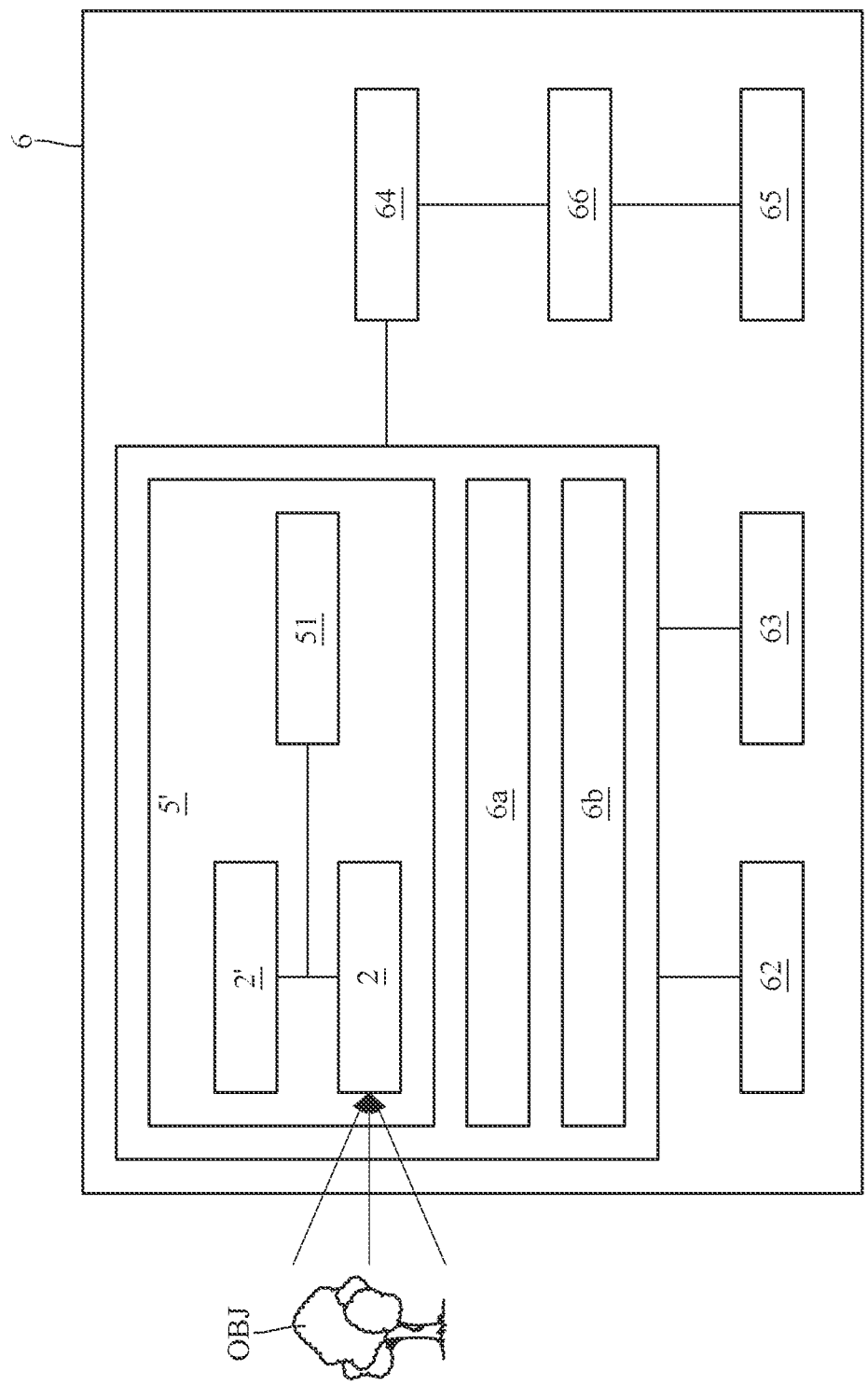
FIG. 21 is a block diagram of the electronic device in FIG. 19.

FIG. 19 is one perspective view of an electronic device according to the 6th embodiment of the present disclosure. FIG. 20 is another perspective view of the electronic device in FIG. 19. FIG. 21 is a block diagram of the electronic device in FIG. 19.

In this embodiment, an electronic device 6 is a mobile device such as a smartphone, a camera, an aerial vehicle, etc., and the present disclosure is not limited thereto. The electronic device 6 including an image capturing unit 5', an image capturing unit 6a, an image capturing unit 6b, an image capturing unit 6c, an image capturing unit 6d, a flash module 62, a focus assist module 63, an image signal processor 64, a user interface 65 and an image software processor 66.

The image capturing unit 5', the image capturing unit 6a and the image capturing unit 6b are disposed on the same side of the electronic device 6. The image capturing unit 6c, the image capturing unit 6d and the user interface 65 are disposed on the opposite side of the electronic device 6. The user interface 65 is a display unit, such that the image capturing units 6c, 6d can be front-facing cameras of the electronic device 6 for taking selfies, but the present disclosure is not limited thereto.

The image capturing unit 5' is similar to the image capturing unit 5 except for having one more imaging lens system. Specifically, the image capturing unit 5' is a dual-lens image capturing unit including two imaging lens systems, one of the imaging lens systems can be the imaging lens system 2 in the abovementioned 2nd embodiment, while the other one of the imaging lens systems is an imaging lens system 2'. In this case, the imaging lens system 2' can be similar to the imaging lens system 2, and the imaging lens system 2' can share one of the magnet components 2402 of the imaging lens system 2. In other words, the number of the magnet component 2402' of the imaging lens system 2' can be one less than the number of the coils 2401' of the imaging lens system 2'. The image capturing unit 5' can simultaneously capture images through the two imaging lens systems 2 and 2' so as to generate a three-dimensional (3D) image or to focus on different objects; alternatively, the image capturing unit 5' can capture a two-dimensional (2D) image through one of the two imaging lens systems 2 and 2'. The abovementioned image capturing unit 5' including two similar imaging lens systems 2 and 2' is only exemplary, and the present disclosure is not limited thereto. In some embodiments, the image capturing unit may include two different imaging lens systems which can collaborated with each other to generate a zoom effect, or they can collect visible light and infrared light at the same time.

Furthermore, each of the image capturing units 6a, 6b, 6c and 6d can include the imaging lens system of the present disclosure and can have a configuration similar to that of the image capturing unit 5. In detail, image capturing unit 6a includes the imaging lens system 1 disclosed in the 1st embodiment, an image sensor 61a and an image stabilizer (not shown); the image capturing unit 6c is similar to the image capturing unit 5' which is a dual-lens image capturing unit including two imaging lens systems 2 and 2'; each of the image capturing units 6b and 6d can include an imaging lens system, an image sensor and an image stabilizer, and each of the imaging lens systems of the image capturing units 6b and 6d can include an optical lens assembly such as the optical elements of the present disclosure, a barrel such as the plastic lens barrel of the preset disclosure and a holder member for holding the optical lens assembly.

Each of the image capturing unit 5' and the image capturing unit 6c is a dual-lens image capturing unit, the image capturing unit 6a is an ultra-wide-angle image capturing unit, the image capturing unit 6b is a telephoto image capturing unit, and the image capturing unit 6d is a ToF (time of flight) image capturing unit. In this embodiment, the image capturing units 5', 6a and 6b have different fields of view, such that the electronic device 6 can have various magnification ratios so as to meet the requirement of optical zoom functionality. In addition, the image capturing unit 6d can determine depth information of the imaged object. In this embodiment, the electronic device 6 includes multiple image capturing units 5', 6a, 6b, 6c and 6d, but the present disclosure is not limited to the number and arrangement of image capturing units.

When a user captures images of an object OBJ, light rays converge in the image capturing unit 5', the image capturing unit 6a or the image capturing unit 6b to generate image(s), and the flash module 62 is activated for light supplement. The focus assist module 63 detects the object distance of the imaged object OBJ to achieve fast auto focusing. The image signal processor 64 is configured to optimize the captured image to improve image quality. The light beam emitted from the focus assist module 63 can be either conventional infrared or laser.

In addition, the light rays may converge in the image capturing unit 6c or 6d to generate an image(s). The electronic device 6 can include a reminder light 6e that can be illuminated to remind the user that the image capturing unit 6c or 6d of the electronic device 6 is working. The user interface 65 can be a touch screen or a physical button 651. The user is able to interact with the user interface 65 and the image software processor 66 having multiple functions to capture images and complete image processing. The image processed by the image software processor 66 can be displayed on the user interface 65. The user can replay the previously captured image through an image playback button 652 of the user interface 65, can choose a suitable image capturing unit for shooting through an image capturing units switching button 653 of the user interface 65, and can properly adjust shooting parameters according to current shooting situations through an integrated menu button 654 of the user interface 65. In addition, the user interface 65 can further have a floating window 655 for the user to simultaneously execute applications other than shooting.

Further, the electronic device 6 further includes a circuit board 67 and a plurality of electronic components 68 disposed on the circuit board 67. The image capturing units 5', 6a, 6b, 6c and 6d are electrically connected to the electronic components 68 via connectors 671 of the circuit board 67. The electronic components 68 can include a signal emitting module 681 and can transmit image(s) to other electronic device or a cloud storage via the signal emitting module 681, wherein the signal emitting module 681 can be a wireless fidelity (WiFi) module, a Bluetooth module, an infrared module, a network service module or an integrated module for transmitting various signals mentioned above, and the present disclosure is not limited thereto.

The electronic components 68 can also include a storage unit 682, a random access memory 683 for storing image information, a gyroscope 684, and a position locator 685 for facilitating the navigation or positioning of the electronic device 6. In this embodiment, the image signal processor 64, the image software processor 66 and the random access memory 683 are integrated into a single chip system 69, but the present disclosure is not limited thereto. In some other embodiments, the electronic components can also be integrated in the image capturing unit or can also be disposed on one of the circuit boards.

The mobile devices in these embodiments are only exemplary for showing the imaging lens systems 1-4 of the present disclosure installed in the electronic device 6, and the present disclosure is not limited thereto. The imaging lens systems 1-4 can be optionally applied to optical systems with a movable focus. Furthermore, the imaging lens systems 1-4 features good capability in aberration corrections and high image quality, and can be applied to 3D image capturing applications, in products such as digital cameras, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system, having an optical axis and an image surface through which the optical axis passes, and the imaging lens system comprising:
    a plastic lens barrel, surrounding the optical axis, wherein the plastic lens barrel comprises an image-side portion and an object-side aperture, the image-side portion is located between the image surface and the object-side aperture, and the optical axis passes through the object-side aperture;
    wherein the image-side portion comprises a plurality of protrusive structures surrounding the optical axis and extending towards the image surface, and each of the plurality of protrusive structures has:
        an inner surface, facing the optical axis;
        an outer surface, disposed opposite to the inner surface, wherein the outer surface is located farther away from the optical axis than the inner surface; and
        at least one reflection-reducing surface, extending along a direction towards the image surface, wherein the at least one reflection-reducing surface is connected to and located between the inner surface and the outer surface;
    wherein each of the plurality of protrusive structures comprises at least one first reflection-reducing structure disposed on the at least one reflection-reducing surface;
    wherein a physical length along a direction parallel to the optical axis of each of the plurality of protrusive structures is H, a physical length along the direction parallel to the optical axis of the imaging lens system is L, and the following condition is satisfied:

$5\% \leq H/L \times 100\% \leq 30\%$.

2. The imaging lens system of claim 1, wherein a number of the plurality of protrusive structures is two, and the protrusive structures are disposed opposite to each other in opposite directions relative to the optical axis.

3. The imaging lens system of claim 1, wherein each of the plurality of protrusive structures further comprises a second reflection-reducing structure disposed on the inner surface, and the second reflection-reducing structure is connected to the at least one first reflection-reducing structure on the at least one reflection-reducing surface.

4. The imaging lens system of claim 1, further comprising a plurality of optical elements received in the plastic lens barrel, wherein the optical axis passes through the plurality of optical elements, and the plurality of protrusive structures are located closer to the image surface than the plurality of optical elements.

5. The imaging lens system of claim 1, wherein the image surface has an appearance of a rectangle, a minimum angle between a line in a direction perpendicular to the optical axis from one of the plurality of protrusive structures to the optical axis and a line in a direction perpendicular to the optical axis from an internal angle of the rectangle to the optical axis is θ1, and the following condition is satisfied:

$$5[\text{deg.}] \leq \theta1 \leq 50[\text{deg.}].$$

6. The imaging lens system of claim 5, wherein a minimum angle between two lines in directions perpendicular to the optical axis from adjacent two of the plurality of protrusive structures to the optical axis is θ2, and the following condition is satisfied:

$$25[\text{deg.}] \leq \theta2 \leq 150[\text{deg.}].$$

7. The imaging lens system of claim 1, wherein a maximum distance along a direction perpendicular to the optical axis from the image surface to the optical axis is IMGH, an axial distance from an object side end of the imaging lens system to the image surface is TTL, a focal length of the imaging lens system is EFL, and the following condition is satisfied:

$$0.6 < IMGH/[(TTL+EFL)/2] < 1.7.$$

8. The imaging lens system of claim 7, wherein the maximum distance along the direction perpendicular to the optical axis from the image surface to the optical axis is IMGH, the axial distance from the object side end of the imaging lens system to the image surface is TTL, the focal length of the imaging lens system is EFL, and the following condition is satisfied:

$$0.7 \leq IMGH/[(TTL+EFL)/2] \leq 1.2.$$

9. The imaging lens system of claim 1, wherein the at least one first reflection-reducing structure has a plurality of reflection-reducing grooves and is a V-shaped structure.

10. The imaging lens system of claim 9, wherein the at least one first reflection-reducing structure comprises a plurality of long protrusions extending towards the image-side portion from the object-side aperture, the plurality of long protrusions are disposed side by side, and the plurality of long protrusions form the V-shaped structure.

11. The imaging lens system of claim 1, wherein the plastic lens barrel further comprises at least one reflection-reducing structure at an image side end thereof, and the at least one reflection-reducing structure of the plastic lens barrel faces the image surface and is connected to the at least one first reflection-reducing structure of the plurality of protrusive structures.

12. The imaging lens system of claim 1, further comprising at least one driving assembly, wherein the plastic lens barrel further comprises at least one mounting structure disposed on an outer surface of the plastic lens barrel and protruding in a direction away from the optical axis, the at least one driving assembly comprises a coil and a magnet component, one of the coil and the magnet component is disposed on the at least one mounting structure, the coil and the magnet component are disposed corresponding to each other, and the coil and the magnet component are configured to drive the imaging lens system to move along the optical axis.

13. An image capturing unit, comprising:
the imaging lens system of claim 1.

14. An electronic device, comprising:
the image capturing unit of claim 13; and
an image sensor, disposed on the image surface of the imaging lens system.

* * * * *